(12) United States Patent
Brantner

(10) Patent No.: US 8,906,523 B2
(45) Date of Patent: Dec. 9, 2014

(54) ENERGY DEVICE WITH INTEGRAL COLLECTOR SURFACE FOR ELECTROMAGNETIC ENERGY HARVESTING AND METHOD THEREOF

(75) Inventor: Paul C. Brantner, Conifer, CO (US)

(73) Assignee: Infinite Power Solutions, Inc., Littleton, CO (US)

( * ) Notice: Subject to any disclaimer, the term of this patent is extended or adjusted under 35 U.S.C. 154(b) by 754 days.

(21) Appl. No.: 12/539,327

(22) Filed: Aug. 11, 2009

(65) Prior Publication Data
US 2010/0032001 A1 Feb. 11, 2010

Related U.S. Application Data

(60) Provisional application No. 61/087,927, filed on Aug. 11, 2008.

(51) Int. Cl.
| | |
|---|---|
| *H01M 10/0525* | (2010.01) |
| *H01M 10/0585* | (2010.01) |
| *H01M 10/44* | (2006.01) |
| *H01M 10/46* | (2006.01) |
| *H01M 14/00* | (2006.01) |
| *H01M 4/70* | (2006.01) |
| *H01L 31/04* | (2014.01) |
| *H02J 17/00* | (2006.01) |
| *H02J 7/02* | (2006.01) |
| *H01L 31/0224* | (2006.01) |
| *H02J 7/00* | (2006.01) |
| *H01L 31/042* | (2014.01) |

(52) U.S. Cl.
CPC ......... *H01L 31/022425* (2013.01); *Y02E 10/50* (2013.01); *Y02E 60/12* (2013.01); *H02J 17/00* (2013.01); *H02J 7/025* (2013.01); *H02J 7/0042* (2013.01); *H01M 10/465* (2013.01); *H01L 31/042* (2013.01); *H01M 10/46* (2013.01)
USPC ................ 429/7; 429/124; 429/233; 320/137

(58) Field of Classification Search
USPC .............. 136/244, 252, 256, 259; 429/7, 124, 429/233; 320/137
See application file for complete search history.

(56) References Cited

U.S. PATENT DOCUMENTS

| | | |
|---|---|---|
| 712,316 A | 10/1902 | Loppe et al. |
| 2,970,180 A | 1/1961 | Urry |

(Continued)

FOREIGN PATENT DOCUMENTS

| | | |
|---|---|---|
| CN | 1415124 | 4/2003 |
| CN | 1532984 | 9/2004 |

(Continued)

OTHER PUBLICATIONS

Balanis, C., Antenna Theory: Analysis Design, 2005, John Wiley & Sons, Inc., 3rd Ed., 811-820.*

(Continued)

*Primary Examiner* — Sean P Cullen
(74) *Attorney, Agent, or Firm* — Blakely, Sokoloff, Taylor & Zafman LLP

(57) ABSTRACT

An apparatus, method, and system to harvest and store electromagnetic energy is disclosed. The present invention uses, for example, conductive surfaces within the energy storage component itself as a means of electromagnetic energy collection. The surface may be an integral portion of the energy device, such as a charge collection surface within a battery or a capacitor that mainly provides the battery or a capacitor with a necessary function. In another embodiment of the invention a metallic or conductive surface is added to and specifically built into the energy device during manufacturing for the main purpose of collecting electromagnetic energy for the energy device but is otherwise not necessary for the energy storage component. Once the energy is collected, it can be rectified either via rectification components that were built directly into the energy storage component during its manufacture or connected external to the energy storage component but within the energy device. The so-designed energy device may represent a self-sustaining, autonomous electromagnetic energy harvesting—energy storage device.

42 Claims, 13 Drawing Sheets

(56) References Cited

U.S. PATENT DOCUMENTS

| | | | |
|---|---|---|---|
| 3,309,302 | A | 3/1967 | Heil |
| 3,616,403 | A | 10/1971 | Collins et al. |
| 3,790,432 | A | 2/1974 | Fletcher et al. |
| 3,797,091 | A | 3/1974 | Gavin |
| 3,850,604 | A | 11/1974 | Klein |
| 3,939,008 | A | 2/1976 | Longo et al. |
| 4,082,569 | A | 4/1978 | Evans, Jr. |
| 4,111,523 | A | 9/1978 | Kaminow et al. |
| 4,127,424 | A | 11/1978 | Ullery, Jr. |
| 4,226,924 | A | 10/1980 | Kimura et al. |
| 4,283,216 | A | 8/1981 | Brereton |
| 4,318,938 | A | 3/1982 | Barnett et al. |
| 4,328,297 | A | 5/1982 | Bilhorn |
| 4,395,713 | A | 7/1983 | Nelson et al. |
| 4,437,966 | A | 3/1984 | Hope et al. |
| 4,442,144 | A | 4/1984 | Pipkin |
| 4,467,236 | A | 8/1984 | Kolm et al. |
| 4,481,265 | A | 11/1984 | Ezawa et al. |
| 4,518,661 | A | 5/1985 | Rippere |
| 4,555,456 | A | 11/1985 | Kanehori et al. |
| 4,572,873 | A | 2/1986 | Kanehori et al. |
| 4,587,225 | A | 5/1986 | Tsukuma et al. |
| 4,619,680 | A | 10/1986 | Nourshargh et al. |
| 4,645,726 | A | 2/1987 | Hiratani et al. |
| 4,664,993 | A | 5/1987 | Sturgis et al. |
| 4,668,593 | A | 5/1987 | Sammells |
| RE32,449 | E | 6/1987 | Claussen |
| 4,672,586 | A | 6/1987 | Shimohigashi et al. |
| 4,710,940 | A | 12/1987 | Sipes, Jr. |
| 4,728,588 | A | 3/1988 | Noding et al. |
| 4,740,431 | A | 4/1988 | Little |
| 4,756,717 | A | 7/1988 | Sturgis et al. |
| 4,785,459 | A | 11/1988 | Baer |
| 4,826,743 | A | 5/1989 | Nazri |
| 4,865,428 | A | 9/1989 | Corrigan |
| 4,878,094 | A | 10/1989 | Balkanski |
| 4,903,326 | A | 2/1990 | Zakman et al. |
| 4,915,810 | A | 4/1990 | Kestigian et al. |
| 4,964,877 | A | 10/1990 | Keister et al. |
| 4,977,007 | A | 12/1990 | Kondo et al. |
| 4,978,437 | A | 12/1990 | Wirz |
| 5,006,737 | A | 4/1991 | Fay |
| 5,019,467 | A | 5/1991 | Fujiwara |
| 5,030,331 | A | 7/1991 | Sato |
| 5,035,965 | A | 7/1991 | Sangyoji et al. |
| 5,055,704 | A | 10/1991 | Link et al. |
| 5,057,385 | A | 10/1991 | Hope et al. |
| 5,085,904 | A | 2/1992 | Deak et al. |
| 5,096,852 | A | 3/1992 | Hobson |
| 5,100,821 | A | 3/1992 | Fay |
| 5,107,538 | A | 4/1992 | Benton et al. |
| 5,110,694 | A | 5/1992 | Nagasubramanian et al. |
| 5,110,696 | A | 5/1992 | Shokoohi et al. |
| 5,119,269 | A | 6/1992 | Nakayama |
| 5,119,460 | A | 6/1992 | Bruce et al. |
| 5,124,782 | A | 6/1992 | Hundt et al. |
| 5,147,985 | A | 9/1992 | DuBrucq |
| 5,153,710 | A | 10/1992 | McCain |
| 5,169,408 | A | 12/1992 | Biggerstaff et al. |
| 5,171,413 | A | 12/1992 | Arntz et al. |
| 5,173,271 | A | 12/1992 | Chen et al. |
| 5,174,876 | A | 12/1992 | Buchal et al. |
| 5,180,645 | A | 1/1993 | Moré |
| 5,187,564 | A | 2/1993 | McCain |
| 5,196,041 | A | 3/1993 | Tumminelli et al. |
| 5,196,374 | A | 3/1993 | Hundt et al. |
| 5,200,029 | A | 4/1993 | Bruce et al. |
| 5,202,201 | A | 4/1993 | Meunier et al. |
| 5,206,925 | A | 4/1993 | Nakazawa et al. |
| 5,208,121 | A | 5/1993 | Yahnke et al. |
| 5,217,828 | A | 6/1993 | Sangyoji et al. |
| 5,221,891 | A | 6/1993 | Janda et al. |
| 5,225,288 | A | 7/1993 | Beeson et al. |
| 5,227,264 | A | 7/1993 | Duval et al. |
| 5,237,439 | A | 8/1993 | Misono et al. |
| 5,252,194 | A | 10/1993 | Demaray et al. |
| 5,262,254 | A | 11/1993 | Koksbang et al. |
| 5,273,608 | A | 12/1993 | Nath |
| 5,287,427 | A | 2/1994 | Atkins et al. |
| 5,296,089 | A | 3/1994 | Chen et al. |
| 5,300,461 | A | 4/1994 | Ting |
| 5,302,474 | A | 4/1994 | Shackle et al. |
| 5,303,319 | A | 4/1994 | Ford et al. |
| 5,306,569 | A | 4/1994 | Hiraki |
| 5,307,240 | A | 4/1994 | McMahon |
| 5,309,302 | A | 5/1994 | Vollmann |
| 5,314,765 | A | 5/1994 | Bates |
| 5,326,652 | A | 7/1994 | Lake |
| 5,326,653 | A | 7/1994 | Chang |
| 5,338,624 | A | 8/1994 | Gruenstern et al. |
| 5,338,625 | A | 8/1994 | Bates et al. |
| 5,342,709 | A | 8/1994 | Yahnke et al. |
| 5,355,089 | A | 10/1994 | Treger et al. |
| 5,360,686 | A | 11/1994 | Peled et al. |
| 5,362,579 | A | 11/1994 | Rossoll et al. |
| 5,381,262 | A | 1/1995 | Arima et al. |
| 5,387,482 | A | 2/1995 | Anani |
| 5,401,595 | A | 3/1995 | Kagawa et al. |
| 5,403,680 | A | 4/1995 | Otagawa et al. |
| 5,411,537 | A | 5/1995 | Munshi et al. |
| 5,411,592 | A | 5/1995 | Ovshinsky et al. |
| 5,419,982 | A | 5/1995 | Tura et al. |
| 5,427,669 | A | 6/1995 | Drummond |
| 5,435,826 | A | 7/1995 | Sakakibara et al. |
| 5,437,692 | A | 8/1995 | Dasgupta et al. |
| 5,445,856 | A | 8/1995 | Chaloner-Gill |
| 5,445,906 | A | 8/1995 | Hobson et al. |
| 5,448,110 | A | 9/1995 | Tuttle et al. |
| 5,449,576 | A | 9/1995 | Anani |
| 5,455,126 | A | 10/1995 | Bates et al. |
| 5,457,569 | A | 10/1995 | Liou et al. |
| 5,458,995 | A | 10/1995 | Behl et al. |
| 5,464,692 | A | 11/1995 | Huber |
| 5,464,706 | A | 11/1995 | Dasgupta et al. |
| 5,470,396 | A | 11/1995 | Mongon et al. |
| 5,472,795 | A | 12/1995 | Atita |
| 5,475,528 | A | 12/1995 | LaBorde |
| 5,478,456 | A | 12/1995 | Humpal et al. |
| 5,483,613 | A | 1/1996 | Bruce et al. |
| 5,493,177 | A | 2/1996 | Muller et al. |
| 5,498,489 | A | 3/1996 | Dasgupta et al. |
| 5,499,207 | A | 3/1996 | Miki et al. |
| 5,501,918 | A | 3/1996 | Gruenstern et al. |
| 5,504,041 | A | 4/1996 | Summerfelt |
| 5,512,147 | A | 4/1996 | Bates et al. |
| 5,512,387 | A | 4/1996 | Ovshinsky |
| 5,512,389 | A | 4/1996 | Dasgupta et al. |
| 5,538,796 | A | 7/1996 | Schaffer et al. |
| 5,540,742 | A | 7/1996 | Sangyoji et al. |
| 5,547,780 | A | 8/1996 | Kagawa et al. |
| 5,547,782 | A | 8/1996 | Dasgupta et al. |
| 5,552,242 | A | 9/1996 | Ovshinsky et al. |
| 5,555,127 | A | 9/1996 | Abdelkader et al. |
| 5,561,004 | A | 10/1996 | Bates et al. |
| 5,563,979 | A | 10/1996 | Bruce et al. |
| 5,565,071 | A | 10/1996 | Demaray et al. |
| 5,567,210 | A | 10/1996 | Bates et al. |
| 5,569,520 | A | 10/1996 | Bates |
| 5,582,935 | A | 12/1996 | Dasgupta et al. |
| 5,591,520 | A | 1/1997 | Migliorini et al. |
| 5,597,660 | A | 1/1997 | Bates et al. |
| 5,597,661 | A | 1/1997 | Takeuchi et al. |
| 5,599,355 | A | 2/1997 | Nagasubramanian et al. |
| 5,601,952 | A | 2/1997 | Dasgupta et al. |
| 5,603,816 | A | 2/1997 | Demaray et al. |
| 5,607,560 | A | 3/1997 | Hirabayashi et al. |
| 5,607,789 | A | 3/1997 | Treger et al. |
| 5,612,152 | A | 3/1997 | Bates et al. |
| 5,612,153 | A | 3/1997 | Moulton et al. |
| 5,613,995 | A | 3/1997 | Bhandarkar et al. |
| 5,616,933 | A | 4/1997 | Li |
| 5,618,382 | A | 4/1997 | Mintz et al. |
| 5,625,202 | A | 4/1997 | Chai |
| 5,637,418 | A | 6/1997 | Brown et al. |

(56) References Cited

U.S. PATENT DOCUMENTS

| | | |
|---|---|---|
| 5,643,480 A | 7/1997 | Gustavsson et al. |
| 5,644,207 A | 7/1997 | Lew et al. |
| 5,645,626 A | 7/1997 | Edlund et al. |
| 5,645,960 A | 7/1997 | Scrosati et al. |
| 5,654,054 A | 8/1997 | Tropsha et al. |
| 5,654,984 A | 8/1997 | Hershbarger et al. |
| 5,658,652 A | 8/1997 | Sellergren |
| 5,660,700 A | 8/1997 | Shimizu et al. |
| 5,665,490 A | 9/1997 | Takeuchi et al. |
| 5,667,538 A | 9/1997 | Bailey |
| 5,677,784 A | 10/1997 | Harris |
| 5,679,980 A | 10/1997 | Summerfelt |
| 5,681,666 A | 10/1997 | Treger et al. |
| 5,686,360 A | 11/1997 | Harvey, III et al. |
| 5,689,522 A | 11/1997 | Beach |
| 5,693,956 A | 12/1997 | Shi et al. |
| 5,702,829 A | 12/1997 | Paidassi et al. |
| 5,705,293 A | 1/1998 | Hobson |
| 5,716,728 A | 2/1998 | Smesko |
| 5,718,813 A | 2/1998 | Drummond et al. |
| 5,719,976 A | 2/1998 | Henry et al. |
| 5,721,067 A | 2/1998 | Jacobs et al. |
| RE35,746 E | 3/1998 | Lake |
| 5,731,661 A | 3/1998 | So et al. |
| 5,738,731 A | 4/1998 | Shindo et al. |
| 5,742,094 A | 4/1998 | Ting |
| 5,755,938 A | 5/1998 | Fukui et al. |
| 5,755,940 A | 5/1998 | Shindo |
| 5,757,126 A | 5/1998 | Harvey, III et al. |
| 5,762,768 A | 6/1998 | Goy et al. |
| 5,763,058 A | 6/1998 | Isen et al. |
| 5,771,562 A | 6/1998 | Harvey, III et al. |
| 5,776,278 A | 7/1998 | Tuttle et al. |
| 5,779,839 A | 7/1998 | Tuttle et al. |
| 5,790,489 A | 8/1998 | O'Connor |
| 5,792,550 A | 8/1998 | Phillips et al. |
| 5,805,223 A | 9/1998 | Shikakura et al. |
| 5,811,177 A | 9/1998 | Shi et al. |
| 5,814,195 A | 9/1998 | Lehan et al. |
| 5,830,330 A | 11/1998 | Lantsman |
| 5,831,262 A | 11/1998 | Greywall et al. |
| 5,834,137 A | 11/1998 | Zhang et al. |
| 5,841,931 A | 11/1998 | Foresi et al. |
| 5,842,118 A | 11/1998 | Wood, Jr. |
| 5,845,990 A | 12/1998 | Hymer |
| 5,847,865 A | 12/1998 | Gopinath et al. |
| 5,849,163 A | 12/1998 | Ichikawa et al. |
| 5,851,896 A | 12/1998 | Summerfelt |
| 5,853,830 A | 12/1998 | McCaulley et al. |
| 5,855,744 A | 1/1999 | Halsey et al. |
| 5,856,705 A | 1/1999 | Ting |
| 5,864,182 A | 1/1999 | Matsuzaki |
| 5,865,860 A | 2/1999 | Delnick |
| 5,870,273 A | 2/1999 | Sogabe et al. |
| 5,874,184 A | 2/1999 | Takeuchi et al. |
| 5,882,721 A | 3/1999 | Delnick |
| 5,882,946 A | 3/1999 | Otani |
| 5,889,383 A | 3/1999 | Teich |
| 5,895,731 A | 4/1999 | Clingempeel |
| 5,897,522 A | 4/1999 | Nitzan |
| 5,900,057 A | 5/1999 | Buchal et al. |
| 5,909,346 A | 6/1999 | Malhotra et al. |
| 5,916,704 A | 6/1999 | Lewin et al. |
| 5,923,964 A | 7/1999 | Li |
| 5,930,046 A | 7/1999 | Solberg et al. |
| 5,930,584 A | 7/1999 | Sun et al. |
| 5,942,089 A | 8/1999 | Sproul et al. |
| 5,948,215 A | 9/1999 | Lantsmann |
| 5,948,464 A | 9/1999 | Delnick |
| 5,948,562 A | 9/1999 | Fulcher et al. |
| 5,952,778 A | 9/1999 | Haskal et al. |
| 5,955,217 A | 9/1999 | Van Lerberghe |
| 5,961,672 A | 10/1999 | Skotheim et al. |
| 5,961,682 A | 10/1999 | Lee et al. |
| 5,966,491 A | 10/1999 | DiGiovanni |
| 5,970,393 A | 10/1999 | Khorrami et al. |
| 5,973,913 A | 10/1999 | McEwen et al. |
| 5,977,582 A | 11/1999 | Flemming et al. |
| 5,982,144 A | 11/1999 | Johnson et al. |
| 5,985,484 A | 11/1999 | Young et al. |
| 5,985,485 A | 11/1999 | Ovshinsky et al. |
| 6,000,603 A | 12/1999 | Koskenmaki et al. |
| 6,001,224 A | 12/1999 | Drummond et al. |
| 6,004,660 A | 12/1999 | Topolski et al. |
| 6,007,945 A | 12/1999 | Jacobs et al. |
| 6,013,949 A | 1/2000 | Tuttle |
| 6,016,046 A | 1/2000 | Kaite et al. |
| 6,019,284 A | 2/2000 | Freeman et al. |
| 6,023,610 A | 2/2000 | Wood, Jr. |
| 6,024,844 A | 2/2000 | Drummond et al. |
| 6,025,094 A | 2/2000 | Visco et al. |
| 6,028,990 A | 2/2000 | Shahani et al. |
| 6,030,421 A | 2/2000 | Gauthier et al. |
| 6,033,768 A | 3/2000 | Muenz et al. |
| 6,042,965 A | 3/2000 | Nestler et al. |
| 6,045,626 A | 4/2000 | Yano et al. |
| 6,045,652 A | 4/2000 | Tuttle et al. |
| 6,045,942 A | 4/2000 | Miekka et al. |
| 6,046,081 A | 4/2000 | Kuo |
| 6,046,514 A | 4/2000 | Rouillard et al. |
| 6,048,372 A | 4/2000 | Mangahara et al. |
| 6,051,114 A | 4/2000 | Yao et al. |
| 6,051,296 A | 4/2000 | McCaulley et al. |
| 6,052,397 A | 4/2000 | Jeon et al. |
| 6,057,557 A | 5/2000 | Ichikawa |
| 6,058,233 A | 5/2000 | Dragone |
| 6,071,323 A | 6/2000 | Kawaguchi |
| 6,075,973 A | 6/2000 | Greeff et al. |
| 6,077,106 A | 6/2000 | Mish |
| 6,077,642 A | 6/2000 | Ogata et al. |
| 6,078,791 A | 6/2000 | Tuttle et al. |
| 6,080,508 A | 6/2000 | Dasgupta et al. |
| 6,080,643 A | 6/2000 | Noguchi et al. |
| 6,093,944 A | 7/2000 | VanDover |
| 6,094,292 A | 7/2000 | Goldner et al. |
| 6,096,569 A | 8/2000 | Matsuno et al. |
| 6,100,108 A | 8/2000 | Mizuno et al. |
| 6,106,933 A | 8/2000 | Nagai et al. |
| 6,110,531 A | 8/2000 | Paz De Araujo |
| 6,115,616 A | 9/2000 | Halperin et al. |
| 6,117,279 A | 9/2000 | Smolanoff et al. |
| 6,118,426 A | 9/2000 | Albert et al. |
| 6,120,890 A | 9/2000 | Chen et al. |
| 6,127,799 A * | 10/2000 | Krishnan ............ 320/104 |
| 6,129,277 A | 10/2000 | Grant et al. |
| 6,133,670 A | 10/2000 | Rodgers et al. |
| 6,137,671 A | 10/2000 | Staffiere |
| 6,144,916 A | 11/2000 | Wood, Jr. et al. |
| 6,146,225 A | 11/2000 | Sheats et al. |
| 6,148,503 A | 11/2000 | Delnick et al. |
| 6,156,452 A | 12/2000 | Kozuki et al. |
| 6,157,765 A | 12/2000 | Bruce et al. |
| 6,159,635 A | 12/2000 | Dasgupta et al. |
| 6,160,373 A | 12/2000 | Dunn et al. |
| 6,162,709 A | 12/2000 | Raoux et al. |
| 6,165,566 A | 12/2000 | Tropsha |
| 6,168,884 B1 | 1/2001 | Neudecker et al. |
| 6,169,474 B1 | 1/2001 | Greeff et al. |
| 6,175,075 B1 | 1/2001 | Shiotsuka et al. |
| 6,176,986 B1 | 1/2001 | Watanabe et al. |
| 6,181,283 B1 | 1/2001 | Johnson et al. |
| 6,192,222 B1 | 2/2001 | Greeff et al. |
| 6,197,167 B1 | 3/2001 | Tanaka |
| 6,198,217 B1 | 3/2001 | Suzuki et al. |
| 6,204,111 B1 | 3/2001 | Uemoto et al. |
| 6,210,544 B1 | 4/2001 | Sasaki |
| 6,210,832 B1 | 4/2001 | Visco et al. |
| 6,214,061 B1 | 4/2001 | Visco et al. |
| 6,214,660 B1 | 4/2001 | Uemoto et al. |
| 6,218,049 B1 | 4/2001 | Bates et al. |
| 6,220,516 B1 | 4/2001 | Tuttle et al. |
| 6,223,317 B1 | 4/2001 | Pax et al. |
| 6,228,532 B1 | 5/2001 | Tsuji et al. |
| 6,229,987 B1 | 5/2001 | Greeff et al. |

(56) References Cited

U.S. PATENT DOCUMENTS

| | | |
|---|---|---|
| 6,232,242 B1 | 5/2001 | Hata et al. |
| 6,235,432 B1 | 5/2001 | Kono et al. |
| 6,236,793 B1 | 5/2001 | Lawrence et al. |
| 6,242,128 B1 | 6/2001 | Tura et al. |
| 6,242,129 B1 | 6/2001 | Johnson |
| 6,242,132 B1 | 6/2001 | Neudecker et al. |
| 6,248,291 B1 | 6/2001 | Nakagama et al. |
| 6,248,481 B1 | 6/2001 | Visco et al. |
| 6,248,640 B1 | 6/2001 | Nam |
| 6,249,222 B1 | 6/2001 | Gehlot |
| 6,252,564 B1 | 6/2001 | Albert et al. |
| 6,258,252 B1 | 7/2001 | Miyasaka et al. |
| 6,261,917 B1 | 7/2001 | Quek et al. |
| 6,264,709 B1 | 7/2001 | Yoon et al. |
| 6,265,652 B1 | 7/2001 | Kurata et al. |
| 6,268,695 B1 | 7/2001 | Affinito |
| 6,271,053 B1 | 8/2001 | Kondo |
| 6,271,793 B1 | 8/2001 | Brady et al. |
| 6,271,801 B2 | 8/2001 | Tuttle et al. |
| 6,280,585 B1 | 8/2001 | Obinata |
| 6,280,875 B1 | 8/2001 | Kwak et al. |
| 6,281,142 B1 | 8/2001 | Basceri |
| 6,284,406 B1 | 9/2001 | Xing et al. |
| 6,287,986 B1 | 9/2001 | Mihara |
| 6,289,209 B1 | 9/2001 | Wood, Jr. |
| 6,290,821 B1 | 9/2001 | McLeod |
| 6,290,822 B1 | 9/2001 | Fleming et al. |
| 6,291,098 B1 | 9/2001 | Shibuya et al. |
| 6,294,722 B1 | 9/2001 | Kondo et al. |
| 6,296,949 B1 | 10/2001 | Bergstresser et al. |
| 6,296,967 B1 | 10/2001 | Jacobs et al. |
| 6,296,971 B1 | 10/2001 | Hara |
| 6,300,215 B1 | 10/2001 | Shin |
| 6,302,939 B1 | 10/2001 | Rabin |
| 6,306,265 B1 | 10/2001 | Fu et al. |
| 6,316,563 B2 | 11/2001 | Naijo et al. |
| 6,323,416 B1 | 11/2001 | Komori et al. |
| 6,324,211 B1 | 11/2001 | Ovard et al. |
| 6,325,294 B2 | 12/2001 | Tuttle et al. |
| 6,329,213 B1 | 12/2001 | Tuttle et al. |
| 6,339,236 B1 | 1/2002 | Tomii et al. |
| 6,340,880 B1 | 1/2002 | Higashijima et al. |
| 6,344,366 B1 | 2/2002 | Bates |
| 6,344,419 B1 | 2/2002 | Forster et al. |
| 6,344,795 B1 | 2/2002 | Gehlot |
| 6,350,353 B2 | 2/2002 | Gopalraja et al. |
| 6,351,630 B2 | 2/2002 | Wood, Jr. |
| 6,356,230 B1 | 3/2002 | Greeff et al. |
| 6,356,694 B1 | 3/2002 | Weber |
| 6,356,764 B1 | 3/2002 | Ovard et al. |
| 6,358,810 B1 | 3/2002 | Dornfest et al. |
| 6,360,954 B1 | 3/2002 | Barnardo |
| 6,361,662 B1 | 3/2002 | Chiba et al. |
| 6,365,300 B1 | 4/2002 | Ota et al. |
| 6,365,319 B1 | 4/2002 | Heath et al. |
| 6,368,275 B1 | 4/2002 | Sliwa et al. |
| 6,369,316 B1 | 4/2002 | Plessing et al. |
| 6,372,383 B1 | 4/2002 | Lee et al. |
| 6,372,386 B1 | 4/2002 | Cho et al. |
| 6,373,224 B1 | 4/2002 | Goto et al. |
| 6,375,780 B1 | 4/2002 | Tuttle et al. |
| 6,376,027 B1 | 4/2002 | Lee et al. |
| 6,379,835 B1 | 4/2002 | Kucherovsky et al. |
| 6,379,842 B1 | 4/2002 | Mayer |
| 6,379,846 B1 | 4/2002 | Terahara et al. |
| 6,380,477 B1 | 4/2002 | Curtin |
| 6,384,573 B1 | 5/2002 | Dunn |
| 6,387,563 B1 | 5/2002 | Bates |
| 6,391,166 B1 | 5/2002 | Wang |
| 6,392,565 B1 | 5/2002 | Brown |
| 6,394,598 B1 | 5/2002 | Kaiser |
| 6,395,430 B1 | 5/2002 | Cho et al. |
| 6,396,001 B1 | 5/2002 | Nakamura |
| 6,398,824 B1 | 6/2002 | Johnson |
| 6,399,241 B1 | 6/2002 | Hara et al. |
| 6,402,039 B1 | 6/2002 | Freeman et al. |
| 6,402,795 B1 | 6/2002 | Chu et al. |
| 6,402,796 B1 | 6/2002 | Johnson |
| 6,409,965 B1 | 6/2002 | Nagata et al. |
| 6,413,284 B1 | 7/2002 | Chu et al. |
| 6,413,285 B1 | 7/2002 | Chu et al. |
| 6,413,382 B1 | 7/2002 | Wang et al. |
| 6,413,645 B1 | 7/2002 | Graff et al. |
| 6,413,676 B1 | 7/2002 | Munshi |
| 6,414,626 B1 | 7/2002 | Greeff et al. |
| 6,416,598 B1 | 7/2002 | Sircar |
| 6,420,961 B1 | 7/2002 | Bates et al. |
| 6,422,698 B2 | 7/2002 | Kaiser |
| 6,423,106 B1 | 7/2002 | Bates |
| 6,423,776 B1 | 7/2002 | Akkapeddi et al. |
| 6,426,163 B1 | 7/2002 | Pasquier et al. |
| 6,432,577 B1 | 8/2002 | Shul et al. |
| 6,432,584 B1 | 8/2002 | Visco et al. |
| 6,433,380 B2 | 8/2002 | Shin |
| 6,433,465 B1 | 8/2002 | McKnight et al. |
| 6,436,156 B1 | 8/2002 | Wandeloski et al. |
| 6,437,231 B2 | 8/2002 | Kurata et al. |
| 6,444,336 B1 | 9/2002 | Jia et al. |
| 6,444,355 B1 | 9/2002 | Murai et al. |
| 6,444,368 B1 | 9/2002 | Hikmet et al. |
| 6,444,750 B1 | 9/2002 | Touhsaent |
| 6,459,418 B1 | 10/2002 | Comiskey et al. |
| 6,459,726 B1 | 10/2002 | Ovard et al. |
| 6,466,771 B2 | 10/2002 | Wood, Jr. |
| 6,475,668 B1 | 11/2002 | Hosokawa et al. |
| 6,480,699 B1 | 11/2002 | Lovoi |
| 6,481,623 B1 | 11/2002 | Grant et al. |
| 6,488,822 B1 | 12/2002 | Moslehi |
| 6,494,999 B1 | 12/2002 | Herrera et al. |
| 6,495,283 B1 | 12/2002 | Yoon et al. |
| 6,497,598 B2 | 12/2002 | Affinito |
| 6,500,287 B1 | 12/2002 | Azens et al. |
| 6,503,661 B1 | 1/2003 | Park et al. |
| 6,503,831 B2 | 1/2003 | Speakman |
| 6,506,289 B2 | 1/2003 | Demaray et al. |
| 6,511,516 B1 | 1/2003 | Johnson et al. |
| 6,511,615 B1 | 1/2003 | Dawes et al. |
| 6,517,968 B2 | 2/2003 | Johnson et al. |
| 6,522,067 B1 | 2/2003 | Graff et al. |
| 6,524,466 B1 | 2/2003 | Bonaventura et al. |
| 6,524,750 B1 | 2/2003 | Mansuetto |
| 6,525,976 B1 | 2/2003 | Johnson |
| 6,528,212 B1 | 3/2003 | Kusumoto et al. |
| 6,529,827 B1 | 3/2003 | Beason et al. |
| 6,533,907 B2 | 3/2003 | Demaray et al. |
| 6,537,428 B1 | 3/2003 | Xiong et al. |
| 6,538,211 B2 | 3/2003 | St. Lawrence et al. |
| 6,541,147 B1 | 4/2003 | McLean et al. |
| 6,548,912 B1 | 4/2003 | Graff et al. |
| 6,551,745 B2 | 4/2003 | Moutsios et al. |
| 6,558,836 B1 | 5/2003 | Whitacre et al. |
| 6,562,513 B1 | 5/2003 | Takeuchi et al. |
| 6,563,998 B1 | 5/2003 | Farah et al. |
| 6,569,564 B1 | 5/2003 | Lane |
| 6,569,570 B2 | 5/2003 | Sonobe et al. |
| 6,570,325 B2 | 5/2003 | Graff et al. |
| 6,572,173 B2 | 6/2003 | Muller |
| 6,573,652 B1 | 6/2003 | Graff et al. |
| 6,576,546 B2 | 6/2003 | Gilbert et al. |
| 6,579,728 B2 | 6/2003 | Grant et al. |
| 6,582,480 B2 | 6/2003 | Pasquier et al. |
| 6,582,481 B1 | 6/2003 | Erbil |
| 6,582,852 B1 | 6/2003 | Gao et al. |
| 6,589,299 B2 | 7/2003 | Missling et al. |
| 6,593,150 B2 | 7/2003 | Ramberg et al. |
| 6,599,662 B1 | 7/2003 | Chiang et al. |
| 6,600,905 B2 | 7/2003 | Greeff et al. |
| 6,602,338 B2 | 8/2003 | Chen et al. |
| 6,603,139 B1 | 8/2003 | Tessler et al. |
| 6,603,391 B1 | 8/2003 | Greeff et al. |
| 6,605,228 B1 | 8/2003 | Kawaguchi et al. |
| 6,608,464 B1 | 8/2003 | Lew et al. |
| 6,608,470 B1 | 8/2003 | Oglesbee et al. |
| 6,610,440 B1 | 8/2003 | LaFollette et al. |

(56) References Cited

U.S. PATENT DOCUMENTS

| | | |
|---|---|---|
| 6,615,614 B1 | 9/2003 | Makikawa et al. |
| 6,616,035 B2 | 9/2003 | Ehrensvard et al. |
| 6,618,829 B2 | 9/2003 | Pax et al. |
| 6,620,545 B2 | 9/2003 | Goenka et al. |
| 6,622,049 B2 | 9/2003 | Penner et al. |
| 6,632,563 B1 | 10/2003 | Krasnov et al. |
| 6,637,906 B2 | 10/2003 | Knoerzer et al. |
| 6,637,916 B2 | 10/2003 | Mullner |
| 6,639,578 B1 | 10/2003 | Comiskey et al. |
| 6,642,895 B2 | 11/2003 | Zurcher et al. |
| 6,645,675 B1 | 11/2003 | Munshi |
| 6,650,000 B2 | 11/2003 | Ballantine et al. |
| 6,650,942 B2 | 11/2003 | Howard et al. |
| 6,662,430 B2 | 12/2003 | Brady et al. |
| 6,664,006 B1 | 12/2003 | Munshi |
| 6,673,484 B2 | 1/2004 | Matsuura |
| 6,673,716 B1 | 1/2004 | D'Couto et al. |
| 6,674,159 B1 | 1/2004 | Peterson et al. |
| 6,677,070 B2 | 1/2004 | Kearl |
| 6,683,244 B2 | 1/2004 | Fujimori et al. |
| 6,683,749 B2 | 1/2004 | Daby et al. |
| 6,686,096 B1 | 2/2004 | Chung |
| 6,693,840 B2 | 2/2004 | Shimada et al. |
| 6,700,491 B2 | 3/2004 | Shafer |
| 6,706,449 B2 | 3/2004 | Mikhaylik et al. |
| 6,709,778 B2 | 3/2004 | Johnson |
| 6,713,216 B2 | 3/2004 | Kugai et al. |
| 6,713,389 B2 | 3/2004 | Speakman |
| 6,713,987 B2 | 3/2004 | Krasnov et al. |
| 6,723,140 B2 | 4/2004 | Chu et al. |
| 6,730,423 B2 | 5/2004 | Einhart et al. |
| 6,733,924 B1 | 5/2004 | Skotheim et al. |
| 6,737,197 B2 | 5/2004 | Chu et al. |
| 6,737,789 B2 | 5/2004 | Radziemski et al. |
| 6,741,178 B1 | 5/2004 | Tuttle |
| 6,750,156 B2 | 6/2004 | Le et al. |
| 6,752,842 B2 | 6/2004 | Luski et al. |
| 6,753,108 B1 | 6/2004 | Hampden-Smith et al. |
| 6,753,114 B2 | 6/2004 | Jacobs et al. |
| 6,760,520 B1 | 7/2004 | Medin et al. |
| 6,764,525 B1 | 7/2004 | Whitacre et al. |
| 6,768,246 B2 | 7/2004 | Pelrine et al. |
| 6,768,855 B1 | 7/2004 | Bakke et al. |
| 6,770,176 B2 | 8/2004 | Benson et al. |
| 6,773,848 B1 | 8/2004 | Nortoft et al. |
| 6,780,208 B2 | 8/2004 | Hopkins et al. |
| 6,797,428 B1 | 9/2004 | Skotheim et al. |
| 6,797,429 B1 | 9/2004 | Komatsu |
| 6,805,998 B2 | 10/2004 | Jenson et al. |
| 6,805,999 B2 | 10/2004 | Lee et al. |
| 6,818,356 B1 | 11/2004 | Bates |
| 6,822,157 B2 | 11/2004 | Fujioka |
| 6,824,922 B2 | 11/2004 | Park et al. |
| 6,827,826 B2 | 12/2004 | Demaray et al. |
| 6,828,063 B2 | 12/2004 | Park et al. |
| 6,828,065 B2 | 12/2004 | Munshi |
| 6,830,846 B2 | 12/2004 | Kramlich et al. |
| 6,835,493 B2 | 12/2004 | Zhang et al. |
| 6,838,209 B2 | 1/2005 | Langan et al. |
| 6,846,765 B2 | 1/2005 | Imamura et al. |
| 6,852,139 B2 | 2/2005 | Zhang et al. |
| 6,855,441 B1 | 2/2005 | Levanon |
| 6,861,821 B2 | 3/2005 | Masumoto et al. |
| 6,863,699 B1 | 3/2005 | Krasnov et al. |
| 6,866,901 B2 | 3/2005 | Burrows et al. |
| 6,866,963 B2 | 3/2005 | Seung et al. |
| 6,869,722 B2 | 3/2005 | Kearl |
| 6,884,327 B2 | 4/2005 | Pan et al. |
| 6,886,240 B2 | 5/2005 | Zhang et al. |
| 6,890,385 B2 | 5/2005 | Tsuchiya et al. |
| 6,896,992 B2 | 5/2005 | Kearl |
| 6,899,975 B2 | 5/2005 | Watanabe et al. |
| 6,902,660 B2 | 6/2005 | Lee et al. |
| 6,905,578 B1 | 6/2005 | Moslehi et al. |
| 6,906,436 B2 | 6/2005 | Jenson et al. |
| 6,911,667 B2 | 6/2005 | Pichler et al. |
| 6,916,679 B2 | 7/2005 | Snyder et al. |
| 6,921,464 B2 | 7/2005 | Krasnov et al. |
| 6,923,702 B2 | 8/2005 | Graff et al. |
| 6,924,164 B2 | 8/2005 | Jensen |
| 6,929,879 B2 | 8/2005 | Yamazaki |
| 6,936,377 B2 | 8/2005 | Wensley et al. |
| 6,936,381 B2 | 8/2005 | Skotheim et al. |
| 6,936,407 B2 | 8/2005 | Pichler |
| 6,949,389 B2 | 9/2005 | Pichler et al. |
| 6,955,986 B2 | 10/2005 | Li |
| 6,962,613 B2 | 11/2005 | Jenson |
| 6,962,671 B2 | 11/2005 | Martin et al. |
| 6,964,829 B2 | 11/2005 | Utsugi et al. |
| 6,982,132 B1 | 1/2006 | Goldner et al. |
| 6,986,965 B2 | 1/2006 | Jenson et al. |
| 6,994,933 B1 | 2/2006 | Bates |
| 7,022,431 B2 | 4/2006 | Shchori et al. |
| 7,033,406 B2 | 4/2006 | Weir et al. |
| 7,045,246 B2 | 5/2006 | Simburger et al. |
| 7,045,372 B2 | 5/2006 | Ballantine et al. |
| 7,056,620 B2 | 6/2006 | Krasnov et al. |
| 7,073,723 B2 | 7/2006 | Fürst et al. |
| 7,095,372 B2 | 8/2006 | Soler Castany et al. |
| 7,129,166 B2 | 10/2006 | Speakman |
| 7,131,189 B2 | 11/2006 | Jenson |
| 7,144,654 B2 | 12/2006 | LaFollette et al. |
| 7,144,655 B2 | 12/2006 | Jenson et al. |
| 7,157,187 B2 | 1/2007 | Jenson |
| 7,158,031 B2 | 1/2007 | Tuttle |
| 7,162,392 B2 | 1/2007 | Vock et al. |
| 7,183,693 B2 | 2/2007 | Brantner et al. |
| 7,186,479 B2 | 3/2007 | Krasnov et al. |
| 7,194,801 B2 | 3/2007 | Jenson et al. |
| 7,198,832 B2 | 4/2007 | Burrows et al. |
| 7,202,825 B2 | 4/2007 | Leizerovich et al. |
| 7,220,517 B2 | 5/2007 | Park et al. |
| 7,230,321 B2 | 6/2007 | McCain |
| 7,247,408 B2 | 7/2007 | Skotheim et al. |
| 7,253,494 B2 | 8/2007 | Mino et al. |
| 7,265,674 B2 | 9/2007 | Tuttle |
| 7,267,904 B2 | 9/2007 | Komatsu et al. |
| 7,267,906 B2 | 9/2007 | Mizuta et al. |
| 7,273,682 B2 | 9/2007 | Park et al. |
| 7,274,118 B2 | 9/2007 | Jenson et al. |
| 7,288,340 B2 | 10/2007 | Iwamoto |
| 7,316,867 B2 | 1/2008 | Park et al. |
| 7,323,634 B2 | 1/2008 | Speakman |
| 7,332,363 B2 | 2/2008 | Edwards |
| 7,335,441 B2 | 2/2008 | Luski et al. |
| RE40,137 E | 3/2008 | Tuttle et al. |
| 7,345,647 B1 | 3/2008 | Rodenbeck |
| 7,348,099 B2 | 3/2008 | Mukai et al. |
| 7,389,580 B2 | 6/2008 | Jenson et al. |
| 7,400,253 B2 | 7/2008 | Cohen |
| 7,410,730 B2 | 8/2008 | Bates |
| RE40,531 E | 10/2008 | Graff et al. |
| 7,466,274 B2 | 12/2008 | Lin et al. |
| 7,468,221 B2 | 12/2008 | LaFollette et al. |
| 7,494,742 B2 | 2/2009 | Tarnowski et al. |
| 7,670,724 B1 | 3/2010 | Chan et al. |
| 7,848,715 B2 | 12/2010 | Boos |
| 7,858,223 B2 | 12/2010 | Visco et al. |
| 8,010,048 B2 | 8/2011 | Brommer et al. |
| 8,056,814 B2 | 11/2011 | Martin et al. |
| 2001/0005561 A1 | 6/2001 | Yamada et al. |
| 2001/0027159 A1 | 10/2001 | Kaneyoshi |
| 2001/0031122 A1 | 10/2001 | Lackritz et al. |
| 2001/0032666 A1 | 10/2001 | Jenson et al. |
| 2001/0033952 A1 | 10/2001 | Jenson et al. |
| 2001/0034106 A1 | 10/2001 | Moise et al. |
| 2001/0041294 A1 | 11/2001 | Chu et al. |
| 2001/0041460 A1 | 11/2001 | Wiggins |
| 2001/0052752 A1 | 12/2001 | Ghosh et al. |
| 2001/0054437 A1 | 12/2001 | Komori et al. |
| 2001/0055719 A1 | 12/2001 | Akashi et al. |
| 2002/0000034 A1 | 1/2002 | Jenson |
| 2002/0001746 A1 | 1/2002 | Jenson |
| 2002/0001747 A1 | 1/2002 | Jenson |

(56) References Cited

U.S. PATENT DOCUMENTS

| | | |
|---|---|---|
| 2002/0004167 A1 | 1/2002 | Jenson et al. |
| 2002/0009630 A1 | 1/2002 | Gao et al. |
| 2002/0019296 A1 | 2/2002 | Freeman et al. |
| 2002/0028377 A1 | 3/2002 | Gross |
| 2002/0033330 A1 | 3/2002 | Demaray et al. |
| 2002/0037756 A1 | 3/2002 | Jacobs et al. |
| 2002/0066539 A1 | 6/2002 | Muller |
| 2002/0067615 A1 | 6/2002 | Muller |
| 2002/0071989 A1 | 6/2002 | Verma et al. |
| 2002/0076133 A1 | 6/2002 | Li et al. |
| 2002/0091929 A1 | 7/2002 | Ehrensvard |
| 2002/0093029 A1 | 7/2002 | Ballantine et al. |
| 2002/0106297 A1 | 8/2002 | Ueno et al. |
| 2002/0110733 A1 | 8/2002 | Johnson |
| 2002/0115252 A1 | 8/2002 | Haukka et al. |
| 2002/0134671 A1 | 9/2002 | Demaray et al. |
| 2002/0139662 A1 | 10/2002 | Lee |
| 2002/0140103 A1 | 10/2002 | Kloster et al. |
| 2002/0159245 A1 | 10/2002 | Murasko et al. |
| 2002/0161404 A1 | 10/2002 | Schmidt |
| 2002/0164441 A1 | 11/2002 | Amine et al. |
| 2002/0170821 A1 | 11/2002 | Sandlin et al. |
| 2002/0170960 A1 | 11/2002 | Ehrensvard et al. |
| 2003/0019326 A1 | 1/2003 | Han et al. |
| 2003/0022487 A1 | 1/2003 | Yoon et al. |
| 2003/0024994 A1 | 2/2003 | Ladyansky |
| 2003/0029493 A1 | 2/2003 | Plessing |
| 2003/0030589 A1 | 2/2003 | Zurcher et al. |
| 2003/0035906 A1 | 2/2003 | Memarian et al. |
| 2003/0036003 A1 | 2/2003 | Shchori et al. |
| 2003/0042131 A1 | 3/2003 | Johnson |
| 2003/0044665 A1 | 3/2003 | Rastegar et al. |
| 2003/0048635 A1 | 3/2003 | Knoerzer et al. |
| 2003/0063883 A1 | 4/2003 | Demaray et al. |
| 2003/0064292 A1 | 4/2003 | Neudecker et al. |
| 2003/0068559 A1 | 4/2003 | Armstrong et al. |
| 2003/0076642 A1 | 4/2003 | Shiner et al. |
| 2003/0077914 A1 | 4/2003 | Le et al. |
| 2003/0079838 A1 | 5/2003 | Brcka |
| 2003/0091904 A1 | 5/2003 | Munshi |
| 2003/0095463 A1 | 5/2003 | Shimada et al. |
| 2003/0097858 A1 | 5/2003 | Strohhofer et al. |
| 2003/0109903 A1 | 6/2003 | Berrang et al. |
| 2003/0127319 A1 | 7/2003 | Demaray et al. |
| 2003/0134054 A1 | 7/2003 | Demaray et al. |
| 2003/0141186 A1 | 7/2003 | Wang et al. |
| 2003/0143853 A1 | 7/2003 | Celii et al. |
| 2003/0146877 A1 | 8/2003 | Mueller |
| 2003/0152829 A1 | 8/2003 | Zhang et al. |
| 2003/0162094 A1 | 8/2003 | Lee et al. |
| 2003/0173207 A1 | 9/2003 | Zhang et al. |
| 2003/0173208 A1 | 9/2003 | Pan et al. |
| 2003/0174391 A1 | 9/2003 | Pan et al. |
| 2003/0175142 A1 | 9/2003 | Milonopoulou et al. |
| 2003/0178623 A1 | 9/2003 | Nishiki et al. |
| 2003/0178637 A1 | 9/2003 | Chen et al. |
| 2003/0180610 A1 | 9/2003 | Felde et al. |
| 2003/0185266 A1 | 10/2003 | Henrichs |
| 2003/0231106 A1 | 12/2003 | Shafer |
| 2003/0232248 A1 | 12/2003 | Iwamoto et al. |
| 2004/0008587 A1 | 1/2004 | Siebott et al. |
| 2004/0015735 A1 | 1/2004 | Norman |
| 2004/0023106 A1 | 2/2004 | Benson et al. |
| 2004/0028875 A1 | 2/2004 | Van Rijn et al. |
| 2004/0029311 A1 | 2/2004 | Snyder et al. |
| 2004/0038050 A1 | 2/2004 | Saijo et al. |
| 2004/0043557 A1 | 3/2004 | Haukka et al. |
| 2004/0048157 A1 | 3/2004 | Neudecker et al. |
| 2004/0058237 A1 | 3/2004 | Higuchi et al. |
| 2004/0072067 A1 | 4/2004 | Minami et al. |
| 2004/0077161 A1 | 4/2004 | Chen et al. |
| 2004/0078662 A1 | 4/2004 | Hamel et al. |
| 2004/0081415 A1 | 4/2004 | Demaray et al. |
| 2004/0081860 A1 | 4/2004 | Hundt et al. |
| 2004/0085002 A1 | 5/2004 | Pearce |
| 2004/0101761 A1 | 5/2004 | Park et al. |
| 2004/0105644 A1 | 6/2004 | Dawes |
| 2004/0106038 A1 | 6/2004 | Shimamura et al. |
| 2004/0106045 A1 | 6/2004 | Ugaji |
| 2004/0106046 A1 | 6/2004 | Inda |
| 2004/0118700 A1 | 6/2004 | Schierle-Arndt et al. |
| 2004/0126305 A1 | 7/2004 | Chen et al. |
| 2004/0151986 A1 | 8/2004 | Park et al. |
| 2004/0161640 A1 | 8/2004 | Salot |
| 2004/0175624 A1 | 9/2004 | Luski et al. |
| 2004/0188239 A1 | 9/2004 | Robison et al. |
| 2004/0209159 A1 | 10/2004 | Lee et al. |
| 2004/0212276 A1 | 10/2004 | Brantner et al. |
| 2004/0214079 A1 | 10/2004 | Simburger et al. |
| 2004/0219434 A1 | 11/2004 | Benson et al. |
| 2004/0245561 A1 | 12/2004 | Sakashita et al. |
| 2004/0258984 A1 | 12/2004 | Ariel et al. |
| 2004/0259305 A1 | 12/2004 | Demaray et al. |
| 2005/0000794 A1 | 1/2005 | Demaray et al. |
| 2005/0006768 A1 | 1/2005 | Narasimhan et al. |
| 2005/0048802 A1 | 3/2005 | Zhang et al. |
| 2005/0070097 A1 | 3/2005 | Barmak et al. |
| 2005/0072458 A1 | 4/2005 | Goldstein |
| 2005/0079418 A1 | 4/2005 | Kelley et al. |
| 2005/0095506 A1 | 5/2005 | Klaassen |
| 2005/0105231 A1 | 5/2005 | Hamel et al. |
| 2005/0110457 A1 | 5/2005 | LaFollette et al. |
| 2005/0112461 A1 | 5/2005 | Amine et al. |
| 2005/0118464 A1 | 6/2005 | Levanon |
| 2005/0130032 A1 | 6/2005 | Krasnov et al. |
| 2005/0133361 A1 | 6/2005 | Ding et al. |
| 2005/0141170 A1 | 6/2005 | Honda et al. |
| 2005/0142447 A1 | 6/2005 | Nakai et al. |
| 2005/0147877 A1 | 7/2005 | Tarnowski et al. |
| 2005/0158622 A1 | 7/2005 | Mizuta et al. |
| 2005/0170736 A1 | 8/2005 | Cok |
| 2005/0175891 A1 | 8/2005 | Kameyama et al. |
| 2005/0176181 A1 | 8/2005 | Burrows et al. |
| 2005/0181280 A1 | 8/2005 | Ceder et al. |
| 2005/0183946 A1 | 8/2005 | Pan et al. |
| 2005/0189139 A1 | 9/2005 | Stole |
| 2005/0208371 A1 | 9/2005 | Kim et al. |
| 2005/0239917 A1 | 10/2005 | Nelson et al. |
| 2005/0255828 A1 | 11/2005 | Fisher |
| 2005/0266161 A1 | 12/2005 | Medeiros et al. |
| 2006/0019504 A1 | 1/2006 | Taussig |
| 2006/0021214 A1 | 2/2006 | Jenson et al. |
| 2006/0021261 A1 | 2/2006 | Face |
| 2006/0040177 A1 | 2/2006 | Onodera et al. |
| 2006/0046907 A1 | 3/2006 | Rastegar et al. |
| 2006/0054496 A1 | 3/2006 | Zhang et al. |
| 2006/0057283 A1 | 3/2006 | Zhang et al. |
| 2006/0057304 A1 | 3/2006 | Zhang et al. |
| 2006/0063074 A1 | 3/2006 | Jenson et al. |
| 2006/0071592 A1 | 4/2006 | Narasimhan et al. |
| 2006/0155545 A1 | 7/2006 | Janye |
| 2006/0201583 A1 | 9/2006 | Michaluk et al. |
| 2006/0210779 A1 | 9/2006 | Weir et al. |
| 2006/0222954 A1 | 10/2006 | Skotheim et al. |
| 2006/0234130 A1 | 10/2006 | Inda |
| 2006/0237543 A1 | 10/2006 | Goto et al. |
| 2006/0255435 A1 | 11/2006 | Fuergut et al. |
| 2006/0286448 A1 | 12/2006 | Snyder et al. |
| 2007/0009802 A1 | 1/2007 | Lee et al. |
| 2007/0021156 A1 | 1/2007 | Hoong et al. |
| 2007/0023275 A1 | 2/2007 | Tanase et al. |
| 2007/0037058 A1 | 2/2007 | Visco et al. |
| 2007/0053139 A1 | 3/2007 | Zhang et al. |
| 2007/0087230 A1 | 4/2007 | Jenson et al. |
| 2007/0091543 A1 | 4/2007 | Gasse et al. |
| 2007/0125638 A1 | 6/2007 | Zhang et al. |
| 2007/0141468 A1 | 6/2007 | Barker |
| 2007/0148065 A1 | 6/2007 | Weir et al. |
| 2007/0148553 A1 | 6/2007 | Weppner |
| 2007/0151661 A1 | 7/2007 | Mao et al. |
| 2007/0164376 A1 | 7/2007 | Burrows et al. |
| 2007/0166612 A1 | 7/2007 | Krasnov et al. |
| 2007/0184345 A1 | 8/2007 | Neudecker et al. |
| 2007/0196682 A1 | 8/2007 | Visser et al. |

(56) References Cited

U.S. PATENT DOCUMENTS

| | | |
|---|---|---|
| 2007/0202395 A1 | 8/2007 | Snyder et al. |
| 2007/0205513 A1 | 9/2007 | Brunnbauer et al. |
| 2007/0210459 A1 | 9/2007 | Burrows et al. |
| 2007/0222681 A1* | 9/2007 | Greene et al. .......... 343/700 MS |
| 2007/0224951 A1 | 9/2007 | Gilb et al. |
| 2007/0229228 A1 | 10/2007 | Yamazaki et al. |
| 2007/0235320 A1 | 10/2007 | White et al. |
| 2007/0264564 A1 | 11/2007 | Johnson et al. |
| 2007/0278653 A1 | 12/2007 | Brunnbauer et al. |
| 2007/0298326 A1 | 12/2007 | Angell et al. |
| 2008/0003496 A1 | 1/2008 | Neudecker et al. |
| 2008/0008936 A1 | 1/2008 | Mizuta et al. |
| 2008/0014501 A1 | 1/2008 | Skotheim et al. |
| 2008/0057397 A1 | 3/2008 | Skotheim et al. |
| 2008/0150829 A1 | 6/2008 | Lin et al. |
| 2008/0213672 A1 | 9/2008 | Skotheim et al. |
| 2008/0233708 A1 | 9/2008 | Hisamatsu |
| 2008/0254575 A1 | 10/2008 | Fuergut et al. |
| 2008/0261107 A1 | 10/2008 | Snyder et al. |
| 2008/0263855 A1 | 10/2008 | Li et al. |
| 2008/0286651 A1 | 11/2008 | Neudecker et al. |
| 2009/0092903 A1 | 4/2009 | Johnson et al. |
| 2009/0124201 A1 | 5/2009 | Meskens |
| 2009/0181303 A1 | 7/2009 | Neudecker et al. |
| 2009/0302226 A1 | 12/2009 | Schieber et al. |
| 2009/0308936 A1 | 12/2009 | Nitzan et al. |
| 2009/0312069 A1 | 12/2009 | Peng et al. |
| 2010/0001079 A1 | 1/2010 | Martin et al. |
| 2010/0086853 A1 | 4/2010 | Venkatachalam et al. |
| 2011/0267235 A1 | 11/2011 | Brommer et al. |
| 2011/0304430 A1 | 12/2011 | Brommer et al. |

FOREIGN PATENT DOCUMENTS

| | | |
|---|---|---|
| DE | 19824145 | 12/1999 |
| DE | 10 2005 014 427 | 9/2006 |
| DE | 10 2006 054 309 | 11/2006 |
| DE | 10 2008 016 665 | 10/2008 |
| DE | 10 2007 030604 | 1/2009 |
| EP | 0 510 883 | 10/1992 |
| EP | 0 639 655 | 2/1995 |
| EP | 0 652 308 | 5/1995 |
| EP | 0 820 088 | 1/1998 |
| EP | 1 068 899 | 1/2001 |
| EP | 0 867 985 | 2/2001 |
| EP | 1 092 689 | 4/2001 |
| EP | 1 189 080 | 3/2002 |
| EP | 1 713 024 | 10/2006 |
| FR | 2806198 | 9/2001 |
| FR | 2 861 218 | 4/2005 |
| JP | 55-009305 | 1/1980 |
| JP | 56-076060 | 6/1981 |
| JP | 56-156675 | 12/1981 |
| JP | 60-068558 | 4/1985 |
| JP | 61-269072 | 11/1986 |
| JP | 62-267944 | 11/1987 |
| JP | 63-290922 | 11/1988 |
| JP | 2-054764 | 2/1990 |
| JP | 2-230662 | 9/1990 |
| JP | 03-036962 | 2/1991 |
| JP | 4-058456 | 2/1992 |
| JP | 4-072049 | 3/1992 |
| JP | 6-010127 | 1/1994 |
| JP | 6-100333 | 4/1994 |
| JP | 7-233469 | 5/1995 |
| JP | 7-224379 | 8/1995 |
| JP | 08-114408 | 5/1996 |
| JP | 10-026571 | 1/1998 |
| JP | 10-239187 | 9/1998 |
| JP | 11-204088 | 7/1999 |
| JP | 2000-144435 | 5/2000 |
| JP | 2000-162234 | 6/2000 |
| JP | 2000-188099 | 7/2000 |
| JP | 2000-268867 | 9/2000 |
| JP | 2001-171812 | 6/2001 |
| JP | 2001-259494 | 9/2001 |
| JP | 2001-297764 | 10/2001 |
| JP | 2001-328198 | 11/2001 |
| JP | 2002-140776 | 5/2002 |
| JP | 2002-344115 | 11/2002 |
| JP | 2003-17040 | 1/2003 |
| JP | 2003-347045 | 12/2003 |
| JP | 2004-071305 | 3/2004 |
| JP | 2004-149849 | 5/2004 |
| JP | 2004-158268 | 6/2004 |
| JP | 2004-273436 | 9/2004 |
| JP | 2005-256101 | 9/2005 |
| JP | 2002-026412 | 2/2007 |
| JP | 7-107752 | 4/2007 |
| JP | 2008-54493 A | 3/2008 |
| JP | 2008-84307 A | 4/2008 |
| KR | 20020007881 | 1/2002 |
| KR | 20020017790 | 3/2002 |
| KR | 20020029813 | 4/2002 |
| KR | 20020033917 | 5/2002 |
| KR | 20030033913 | 5/2003 |
| KR | 20030042288 | 5/2003 |
| KR | 20030085252 | 11/2003 |
| RU | 2241281 | 11/2004 |
| WO | WO 9513629 | 5/1995 |
| WO | WO 9623085 | 8/1996 |
| WO | WO 9623217 | 8/1996 |
| WO | WO 9727344 | 7/1997 |
| WO | WO 9735044 | 9/1997 |
| WO | WO-9739491 A1 | 10/1997 |
| WO | WO 9847196 | 10/1998 |
| WO | WO 9943034 | 8/1999 |
| WO | WO 9957770 | 11/1999 |
| WO | WO 0021898 | 4/2000 |
| WO | WO 0022742 | 4/2000 |
| WO | WO 0028607 | 5/2000 |
| WO | WO 0036665 | 6/2000 |
| WO | WO 0006062 | 10/2000 |
| WO | WO 0060689 | 10/2000 |
| WO | WO 0062365 | 10/2000 |
| WO | WO 0101507 | 1/2001 |
| WO | WO 0117052 | 3/2001 |
| WO | WO 0124303 | 4/2001 |
| WO | WO 0133651 | 5/2001 |
| WO | WO 0139305 | 5/2001 |
| WO | WO 0173864 | 10/2001 |
| WO | WO 0173865 | 10/2001 |
| WO | WO 0173866 | 10/2001 |
| WO | WO 0173868 | 10/2001 |
| WO | WO 0173870 | 10/2001 |
| WO | WO 0173883 | 10/2001 |
| WO | WO 0173957 | 10/2001 |
| WO | WO 0182390 | 11/2001 |
| WO | WO 0212932 | 2/2002 |
| WO | WO 0242516 | 5/2002 |
| WO | WO 0247187 | 6/2002 |
| WO | WO 02071506 | 9/2002 |
| WO | WO 02101857 | 12/2002 |
| WO | WO 03003485 | 1/2003 |
| WO | WO 03005477 | 1/2003 |
| WO | WO 03026039 | 3/2003 |
| WO | WO 03036670 | 5/2003 |
| WO | WO 03069714 | 8/2003 |
| WO | WO 03080325 | 10/2003 |
| WO | WO 03083166 | 10/2003 |
| WO | WO 2004012283 | 2/2004 |
| WO | WO 2004021532 | 3/2004 |
| WO | WO 2004061887 | 7/2004 |
| WO | WO 2004077519 | 9/2004 |
| WO | WO 2004086550 | 10/2004 |
| WO | WO 2004093223 | 10/2004 |
| WO | WO 2004106581 | 12/2004 |
| WO | WO 2004106582 | 12/2004 |
| WO | WO 2005008828 | 1/2005 |
| WO | WO 2005013394 | 2/2005 |
| WO | WO 2005038957 | 4/2005 |
| WO | WO 2005067645 | 7/2005 |
| WO | WO 2005085138 | 9/2005 |

(56) References Cited

FOREIGN PATENT DOCUMENTS

| WO | WO 2005091405 | 9/2005 |
|----|---------------|--------|
| WO | WO 2006063308 | 6/2006 |
| WO | WO-2006/077192 | 7/2006 |
| WO | WO 2006085307 | 8/2006 |
| WO | WO 2007016781 | 2/2007 |
| WO | WO 2007019855 | 2/2007 |
| WO | WO 2007027535 | 3/2007 |
| WO | WO 2007095604 | 8/2007 |
| WO | WO 2008036731 | 3/2008 |

OTHER PUBLICATIONS

Broadband. [online]. Wikipedia. [retrieved on Apr. 14, 2014]. Retrieved from the internet <URL: http://en.wikipedia.org/wiki/Broadband>.*

Narrowband. [online]. Wikipedia. [retrieved on Apr. 14, 2014]. Retrieved from the internet <URL: http://en.wikipedia.org/wiki/Narrowband>.*

Ultra low frequency. [online]. Wikipedia. [retrieved on Apr. 14, 2014]. Retrieved from the internet <URL: http://en.wikipedia.org/wiki/Ultra_low_frequency>.*

Ultra high frequency. [online]. Wikipedia. [retrieved on Apr. 14, 2014]. Retrieved from the internet <URL: http://en.wikipedia.org/wiki/Ultra_high_frequency>.*

Starner "Human-Powered Wearable Computing" 35(3&4) IBM Sys. J. 618-29 (1996)[1].

Strohhofer, C. and Polman, A. "Energy transfer to $Er^{3+}$ in Ag ion-exchanged glass," FOM Institute for Atomic and Molecular Physics, 10 pages (2001).

Sugiyama, A. et al., "Gas Permeation Through the Pinholes of Plastic Film Laminated with Aluminum Foil," Vuoto XXVIII(1-2):51-54 (1999).

Tervonen, A. "Challenges and opportunities for integrated optics in optical networks," SPIE 3620:2-11 (1999).

Ting, C.Y. et al., "Study of planarized sputter-deposited $SiO_2$," J. Vac. Sci Technol, 15(3):1105-1112 (1978).

Tomaszewski, H. et al., "Yttria-stabilized zirconia thin films grown by reactive r.f. magnetron sputtering," Thin Solid Films 287: 104-109 (1996).

Triechel, O. and Kirchhoff, V., "The influences of pulsed magnetron sputtering on topography and crystallinity of $TiO_2$ films on glass," Surface and Coating Technology 123:268-272 (2000).

Tukamoto, H. and West, A.R., "Electronic Conductivity of $LiCoO_s$ and Its Enhancement by Magnesium Doping," J. Electrochem. Soc 144(9):3164-3168 (1997).

Van Dover, R.B., "Amorphous Lanthanide-Doped $TiO_x$ Dielectric Films," Appl. Phys. Lett. 74(20):3041-3043 (1999).

Viljanen, J. and Leppihalme, M., "Planner Optical Coupling Elements for Multimode Fibers with Two-Step Ion Migration Process," Applied Physics 24(1):61-63 (1981).

Villegas, M.A. et al., "Optical spectroscopy of a soda lime glass exchanged with silver," Phys. Chem. Glasses 37(6):248-253 (1996).

Von Rottkay, K. et al., "Influences of stoichiometry on electrochromic cerium—titanium oxide compounds," Presented at the $11^{th}$ Int'l Conference of Solid State Ionics, Honolulu, Hawaii, Nov. 19, 1997, Published in Solid State Ionics 113-115:425-430. (1998).

Wang, B. et al., "Characterization of Thin-Film Rechargeable Lithium Batteries with Lithium Cobalt Oxide Cathodes," J. Electrochem. Soc. 143:3203-13 (1996).

Westlinder, J. et al., "Simulations and Dielectric Characterization of Reactive dc Magnetron Cosputtered $(Ta_2O_5)_{1-x}(TiO_2)_x$ Thin Films," J Vac. Sci. Technol. B 20(3):855-861 (May/Jun. 2002).

Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).

Chang, C.Y. and Sze, S.M. (eds.), in ULSI Technology, The McGraw-Hill Companies, Inc., Nyew York, Chapter 4, pp. 169-170 and 226-231 (1996).

Chen, G. et al., "Development of supported bifunctional electrocatalysts for unitized regenerative fuel cells," J. Electrochemical Society 149(8): A1092-A1099 (2002).

Choi, Y.B. et al., "Er—Al-codoped silicate planar light waveguide-type amplifier fabricated by radio-frequency sputtering," Optics Letters 25(4): 263-265 (2000).

Choy et al., "Eu-Doped Y2O3 Phosphor Films Produced by Electrostatic-Assisted Chemical Vapor Deposition," J. Mater. Res. 14(7): 3111-3114 (Jul. 1999).

Cocorullo, G. et al., "Amorphous silicon waveguides and light modulators for integrated photonics realized by low-temperature plasma-enhanced chemical-vapor deposition," Optics Lett. 21(24): 2002-2004 (1996).

Cooksey, K. et al., "Predicting permeability & Transmission rate for multilayer materials," Food Technology 53(9): 60-63 (1999).

Crowder, M.A. et al., "Low-temperature single-crystal Si TFT's fabricated on Si films processed via sequential lateral solidification," IEEE Electron Device Lett. 19(8): 306-308 (1998).

Delavaux, J-M. et al., "Integrated optics erbium ytterbium amplifier system in 10Gb/s fiber transmission experiment," $22^{nd}$ Euporean Conference on Optical Communication, Osla, I.123-I.126 (1996).

Distributed Energy Resources: Fuel Cells, Projects, 4 pages http://www.eere.energy.gov/der/fuel_cells/projects.html (2003).

Dorey, R.A., "Low temperature micromoulding of functional ceramic devices," Grant summary for GR/S84156/01 for the UK Engineering and Physical Sciences Research Council, 2 pages (2004).

DuPont Teijin Films, Mylar 200 SBL 300, Product Information, 4 pages (2000).

Electrometals Technologies Limited, Financial Report for 2002, Corporate Directory, Chairman's review, Review of Operations, 10 pages (2002).

E-Tek website: FAQ, Inside E-Tek, E-Tek News, Products; http://www.etek-inc.com/, 10 pages (2003).

Flytzanis, C. et al., "Nonlinear optics in composite materials," in Progress in Optics XXIX, Elsevier Science Publishers B.V., pp. 323-425 (1991).

Frazao, O. et al., "EDFA gain flattening using long-period fibre gratings based on the electric arc technique," Proc. London Comm. Symp. 2001, London, England, 3 pages (2001).

Fujii, M. et al., "1.54 µm photoluminescence of $Er^{3+}$ doped into $SiO_2$ films containing Si nanocrystals: evidence for energy transfer from Si nanocrystals for $Er^{3+}$," Appl. Phys. Lett. 71(9): 1198-1200 (1997).

Garcia, C. et al., "Size dependence of lifetime and absorption cross section of Si nanocrystals embedded in $SiO_2$," Appl. Phys. Lett. 82(10): 1595-1597 (2003).

Goossens, A. et al., "Sensitization of $TiO_2$ with p-type semiconductor polymers," Chem. Phys. Lett. 287: 148 (1998).

Greene, J.E. et al., "Morphological and electrical properties of rf sputtered $Y_2O_3$-doped $ZrO_2$ thin films," J. Vac. Sci. Tech. 13(1): 72-75 (1976).

Han, H.-S. et al., "Optical gain at 1.54 µm in Erbium-doped Silicon nanocluster sensitized waveguide," Appl. Phys. Lett 79(27): 4568-4570 (2001).

Hayakawa, T. et al., "Enhanced fluorescence from $Eu^{3+}$ owing to surface plasma oscillation of silver particles in glass," J. Non-Crystalline Solids 259: 16-22 (1999).

Hayakawa, T. et al., "Field enhancement effect of small Ag particles on the fluorescence from $Eu^{3+}$-doped $SiO_2$ glass," Appl. Phys. Lett. 74(11): 1513-1515 (1999).

Hayfield, P.C.S., I Development of a New Material-Monolithic $Ti_4O_7$ Ebonix® Ceramic, Royal Society of Chemistry, Cambridge, Table of Contents, 4 pages (2002).

Hehlen, M.P. et al., "Spectroscopic properties of $Er^{3+}$- and $Yb^{3+}$-doped soda-lime silicate and aluminosilicate glasses," Physical Review B 56(15): 9302-9318 (1997).

Hehlen, M.P. et al., "Uniform upconversion in high-concentration $Er^{3+}$-doped soda lime silicate and aluminosilicate glasses," Optics Letters 22(11); 772-774 (1997).

Horst, F. et al., "Compact, tunable optical devices in silicon-oxynitride waveguide technology," Top. Meeting Integrated Photonics Res. '00, Quebec, Canada, p. IThF1, 3 pages (2000).

(56) References Cited

OTHER PUBLICATIONS

Howson, R.P., "The reactive sputtering of oxides and nitrides," Pure & Appl. Chem. 66(6): 1311-1318 (1994).
Hubner, J. and Guldberg-Kjaer, S., "Planar Er- and Yb-doped amplifiers and lasers," COM Technical University of Denmark, 10th European Conf. on Integrated Optics, Session WeB2, pp. 71-74 (2001).
Hwang et al., "Characterization of sputter-deposited LiMn2O4 thin films for rechargeable microbatteries," 141(12) J. Electrochem. Soc. 3296-99 (1994).
Hwang, M-S. et al., "The effect of pulsed magnetron sputtering on the properties of iridium tin oxide thin films," Surface and Coatings Tech. 171: 29-33 (2003).
Im, J.S. and Sposili, R.S., "Crystalline Si films for integrated active-matrix liquid crystal displays," MRS Bulletin, pp. 39-48 (1996).
Im, J.S. et al., "Controlled super-lateral growth of Si-films for microstructural manipulation and optimization," Physica Status Solidi (A) 166(2): 603-617 (1998).
Im, J.S. et al., "Single-crystal Si films for thin-film transistor devices," Appl. Physics Lett. 70(25): 3434-3436 (1997).
Itoh, M. et al., "Large reduction of singlemode-fibre coupling loss in 1.5% Δ planar lightwave circuits using spot-size converters," Electronics Letters 38(2): 72-74 (2002).
Jackson, M.K. and Movassaghi, M., "An accurate compact EFA model," Eur. Conf. Optical Comm., Munich, Germany, 2 pages (2000).
Janssen, R. et al., "Photoinduced electron transfer from conjugated polymers onto nanocrystalline $TiO_2$," Synthet. Metal., 1 page (1999).
Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).
Jonsson, L.B. et al., "Frequency response in pulsed DC reactive sputtering processes," Thin Solid Films 365: 43-48 (2000).
Kato, K. and Inoue, Y., "Recent progress on PLC hybrid integration," SPIE 3631: 28-36 (1999).
Kato, K. and Tohmori, Y., "PLC hybrid integration technology and its application to photonic components," IEEE J. Selected Topics in Quantum Electronics 6(1): 4-13 (2000).
Kelly, P.J. and Arnell, R.D., "Control of the structure and properties of aluminum oxide coatings deposited by pulsed magnetron sputtering," J. Vac. Sci. Technol. A 17(3):945-953 (1999).
Kelly, P.J. et al., "A novel technique for the deposition of aluminum-doped zinc oxide films," Thin Solid Films 426(1-2): 111-116 (2003).
Kelly, P.J. et al., "Reactive pulsed magnetron sputtering process for alumina films," J. Vac. Sci. Technol. A 18(6): 2890-2896 (2000).
Kik, P.G. and Polman, A., "Gain limiting processes in Er-doped Si nanocrystal waveguides in $SiO_2$," J. Appl. Phys. 91(1): 536-536 (2002).
Kim et al., "Correlation Between the Microstructures and the Cycling Performance of $RuO_2$ Electrodes for Thin-Film Microsupercapacitros," J. Vac. Sci. Technol. B20(5): 1827-1832 (Sep. 2002).
Kim, D-W. et al. "Mixture Behavior and Microwave Dielectric Properties in the Low-fired $TiO_2$—CuO System," Jpn. J. Appl. Phys. 39:2696-2700 (2000).
Kim, H-K. et al., "Characteristics of rapid-thermal-annealed LiCoO2 cathode film for an all-solid-state thin film microbattery," J. Vac. Sci. Technol. A 22(4): 1182-1187 (2004).
Kim, J-Y. et al. "Frequency-dependent pulsed direct current magnetron sputtering of titanium oxide films," J. Vac. Sci. Technol. A 19(2):429-434 (2001).
Ladouceur, F. and Love, J.D., in: Silica-based Buried Channel Waveguides and Devices, Chapman & Hall, London, Table of Contents, 6 pages (1996).
Ladouceur, F. et al., "Effect of side wall roughness in buried channel waveguides," IEEE Proc. Optoelectron. 141(4):242-248 (1994).
Lamb, W. and Zeiler, R., Designing Non-Foil Containing Skins for Vacuum Insulation Panel (VIP) Application, Vuoto XXVIII(1-2):55-58 (1999).
Lamb, W.B., "Designing Nonfoil Containing Skins for VIP Applications," DuPont VIA Symposium Presentation, 35 Pages (1999).
Lange, M.R. et al, "High Gain Ultra-Short Length Phosphate glass Erbium-Doped Fiber Amplifier Material," OSA Optical Fiber Communications (OFC), 3 Pages (2002).
Laporta, P. et al, "Diode-pumped cw bulk Er: Yb: glass laser," Optics Letters 16(24):1952-1954 (1991).
Laurent-Lund, C. et al., "PECVD Grown Multiple Core Planar Waveguides with Extremely Low Interface Reflections and Losses," IEEE Photonics Tech. Lett. 10(10):1431-1433 (1998).
Yanagawa, H. et al., "Index-and-Dimensional Taper and Its Application to Photonic Devices," J. Lightwave Technology 10(5):587-591 (1992).
Yoshikawa, K. et al., "Spray formed aluminum alloys for sputtering targets," Powder Metallurgy 43(3): 198-199 (2000).
Zhang, H. et al., "High Dielectric Strength, High k $TiO_2$ Films by Pulsed DC, Reactive Sputter Deposition," 5 pages (2001).
Abraham, K.M. et al., "Inorganic-organic composite solid polymer electrolytes," 147(4) J. Electrochem. Soc. 1251-56 (2000).
Appetecchi, G.B. et al., "Composite polymer electrolytes with improved lithium metal electrode interfacial properties," 145(12) J. Electrochem. Soc. 4126-32 (1998).
Bates, J.B. et al., "Electrical properties of amorphous lithium electrolyte thin films," 53-56 Solid State Ionics 647-54 (1992).
Abrahams, I., "$Li_6Zr_2O_7$, a new anion valancy ccp based structure, determined by ab initio powder diffraction methods," 104 J. Solid State Chem. 397-403 (1993).
Amatucci, G. et al., "Lithium scandium phosphate-based electrolytes for solid state lithium rechargeable microbatteries," 60 Solid State Ionics 357-65 (1993).
Yu, X. et al., "A stable thin-film lithium electrolyte: lithium phosphorus oxynitride," 144(2) J. Electrochem. Soc. 524-532 (1997).
Delmas, C. et al., "Des conducteurs ioniques pseudo-bidimensionnels $Li_8MO_6$ (M=Zr, Sn), $Li_7LO_6$ (L=Nb, Ta) et $Li_6In_2O_6$," 14 Mat. Res. Bull. 619-25 (1979).
Hu, Y-W. et al., "Ionic conductivity of lithium phosphate-doped lithium orthosilicate," 11 Mat. Res. Bull. 1227-30 (1976).
Neudecker, B. et al., "$Li_9SiAlO_8$: a lithium ion electrolyte for voltages above 5.4 V," 143(7) J. Electrochem. Soc. 2198-203 (1996).
Ohno, H. et al., "Electrical conductivity of a sintered pellet of octalithium zirconate," 132 J. Nucl. Mat. 222-30 (1985).
Scholder, V. et al., "Über Zirkonate, Hafnate und Thorate von Barium, Strontium, Lithium und Natrium," Zeitschrift für Anorganische und Allgemeine Chemie, Band 362, pp. 149-168 (1968).
Sarro, P., "Silicon Carbide as a New MEMS Technology," Sensors and Actuators 82, 210-218 (2000).
Hwang et al., "Characterization of Sputter-Deposited $LiMn_2O_4$ Thin Films for Rechargeable Microbatteries," 141(12) J. Electrochem. Soc. 3296-99 (1994).
Jones et al., 53-56 Solid State Ionics 628 (1992).
Mattox "Handbook of Physical Vapor Deposition (PVD) Processing, Society of Vacuum Coaters," Albuquerque, New Mexico 660f and 692ff, Noyes Publications (1998).
Affinito, J.D. et al., "PML/oxide/PML barrier layer performance differences arising from use of UV or electron beam polymerization of the PML layers" Thin Solid Films 308-309: 19-25 (1997).
Affinito, J.D. et al., "Polymer-oxide transparent barrier layers," Society of Vacuum Coaters, 39th Ann. Technical Conference Proceedings, May 5-10, 1996, Philadelphia, PA, pp. 392-397 (1996).
Alder, T. et al., "High-efficiency fiber-to-chip coupling using low-loss tapered single-mode fiber," IEEE Photonics Tech. Lett. 12(8): 1016-1018 (2000).
Almeida, V.R. et al., "Nanotaper for compact mode conversion," Optics Letters 28(15): 1302-1304 (2003).
Anh et al., "Significant Suppression of Leakage Current in $(Ba,Sr)TiO_3$ Thin Films by Ni or Mn Doping," J. Appl. Phys.,92(5): 2651-2654 (Sep. 2002).
Asghari, M. and Dawnay, E., "ASOC™—a manufacturing integrated optics technology," SPIE 3620:252-262 (Jan. 1999).
Barbier, D. et al., "Amplifying four-wavelength combiner, based on erbium/ytterbium-doped waveguide amplifiers and integrated splitters," IEEE Photonics Tech. Lett. 9:315-317 (1997).

(56) References Cited

OTHER PUBLICATIONS

Barbier, D., "Performances and potential applications of erbium doped planar waveguide amplifiers and lasers," Proc. OAA, Victoria, BC, Canada, pp. 58-63 (Jul. 21-23, 1997).

Bates et al., "Thin-Film Lithium Batteries" in New Trends in Electrochemical Technology: Energy & Storage Systems for Electronics (T. Osaka & M. Datta eds. Gordon and Breach 2000).

Beach R.J., "Theory and optimization of lens ducts," Applied Optics 35(12): 2005-2015 (1996).

Belkind, A. et al., "Pulsed-DC Reactive Sputtering of Dielectrics: Pulsing Parameter Effects," 43rd Annual Technical Conference Proceedings (2000).

Belkind, A. et al., "Using pulsed direct current power for reactive sputtering of $Al_2O_3$," J. Vac. Sci. Technol. A 17(4): 1934-1940 (1999).

Bestwick, T., "ASOC™ silicon integrated optics technology," SPIE 3631: 182-190 (1999).

Borsella, E. et al., "Structural incorporation of silver in soda-lime glass by the ion-exchange process: a photoluminescence spectroscopy study," Applied Physics A 71: 125-132 (2000).

Byer, R.L., "Nonlinear optics and solid-state lasers: 2000," IEEE J. Selected Topics in Quantum Electronics 6(6): 911-930 (2000).

Campbell, S.A. et al., "Titanium dioxide (TiO2)-based gate insulators," IBM J. Res. Develop. 43(3): 383-392 (1999).

Lee, B.H. et al., "Effects of interfacial layer growth on the electrical characteristics of thin titanium oxide films on silion," Appl. Phys. Lett. 74(21):3143-3145 (1999).

Lee, K.K. et al., "Effect of size and roughness on light transmission in a $Si/SiO_2$ waveguide: Experiments and model," Appl. Phys. Lett. 77(11):1617-1619 (2000).

Love, J.D. et al., "Quantifying Loss Minimisation in Single-Mode Fibre Tapers," Electronics Letters 22(17):912-914 (1986).

Mardare, D. and Rusu, G.I., "On the structure of Titanium Oxide Thin Films," Andalele Stiintifice Ale Universitatii IASI, Romania, pp. 201-208 (1999).

Marques, P.V.S. et al., "Planar Silica-on-Silicon Waveguide Lasers Based in Two Layers Core Devices," 10th European Conference on Integrated Optics, Session WeB2, pp. 79-82 (2001).

Meijerink, A. et al, "Luminescence of $Ag^+$ in Crystalline and Glassy $Srb_4O_7$," J. Physics Chem. Solids 54(8):901-906 (1993).

Mesnaoui, M. et al, "Spectroscopic properties of $Ag^+$ ions in phosphate glasses of $NaPO_3$—$AgPO_3$ system," Eur. J. Solid State Inorg. Chem. 29:1001-1013 (1992).

Mitomi, O. et al., "Design of a Single-Mode Tapered Waveguide for Low-Loss Chip-to-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Ohkubo, H. et al., Polarization-Insensitive Arrayed-Waveguide Grating Using Pure $SiO_2$ Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 Page (2004).

Ohtsuki, T., et al., "Gain Characteristics of high concentration $Er^{3+}$-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC 2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., "Planar $Er^{3+}$-doped aluminosilicate waveguide amplifier with more than 10 dB gain across C-band," Optical Society of America, 3 pages (2000).

Park et al., "Characteristics of Pt Thin Film on the Conducting Ceramics TiO and Ebonex ($Ti_4O_7$) as Electrode Materials," Thin Solid Films 258: 5-9 (1995).

Peters, D.P. et al., "Formation mechanism of silver nanocrystals made by ion irradiation of $Na^+$—$Ag^+$ ion-exchanged sodalime silicate glass," Nuclear Instruments and Methods in Physics Research B 168:237-244 (2000).

Rajarajan, M. et al., "Numerical Study of Spot-Size Expanders fro an Efficient OEIC to SMF Coupling," IEEE Photonics Technology Letters 10(8): 1082-1084 (1998).

Ramaswamy, R.V. et al., "Ion-Exchange Glass Waveguides: A Review," J. Lightwave Technology 6(6): 984-1002 (1988).

Roberts, S.W. et al., "The Photoluminescence of Erbium-doped Silicon Monoxide," University of Southampton, Department of Electronics and Computer Science Research Journal, 7 pages (1996).

Saha et al., "Large Reduction of Leakage Current by Graded-Layer La Doping in (Ba0.5,Sr0.5)TiO3 Thin Films," Appl. Phys. Lett. 79(1): 111-113 (Jul. 2001).

Sanyo Vacuum Industries Co., Ltd. Products Infor, $TiO_2$, (2003), 1 page, http://www.sanyovac.co.jp/Englishweb/products?ETiO2.htm.

Schermer, R. et al., "Investigation of Mesa Dielectric Waveguides," Proceedings of the OSA Integrated Photonics Research Topical Meeting and Exhibit, Paper No. IWB3, 3 pages (2001).

Schiller, S. et al., "PVD Coating of Plastic Webs and Sheets with High Rates on Large Areas," European Materials Research Society 1999 Spring Meeting, Jun. 1-4, 1999, Strasbourg, France, 13 pages (1999).

Scholl, R., "Power Supplies for Pulsed Plasma Technologies: State-of-the-Art and Outlook," Advances Energy Industries, Inc. 1-8 (1999).

Scholl, R., "Power Systems for Reactive Sputtering of Insulating Films," Advances Energy Industries, Inc., 1-8 (Aug. 2001).

Second International Symposium of Polymer Surface Modification: Relevance to Adhesion, Preliminary Program, 13 pages (1999).

Seventh International Conference on $TiO_2$ Photocatalysis: Fundamentals & Applications, Toronto, Ontario, Canada, Final Program, 7 pages (Nov. 17-21, 2002).

Sewell, P. et al., "Rib Waveguide Spot-Size Transformers: Modal Properties," J Lightwave Technology 17(5):848-856 (1999).

Shaw, D.G. et al., "Use of Vapor Deposited Acrylate Coatings to Improve the Barrier Properties of Metallized Film," Society of Vacuum Coaters, 37th Annual Technical Conference Proceedings, pp. 240-244 (1994).

Shin, J.C. et al. "Dielectric and Electrical Properties of Sputter Grown $(Ba,Se)TiO_3$ Thin Films," J. Appl. Phys. 86(1):506-513 (1999).

Shmulovich, J. et al., "Recent progress in Erbium-doped waveguide amplifiers," Bell Laboratories, pp. 35-37 (1999).

Slooff, L.H. et al., "Optical properties of Erbium-doped organic polydentate cage complexes," J. Appl. Phys. 83(1):497-503 (1998).

Smith, R.E. et al., "Reduced Coupling Loss Using a Tapered-Rib Adiabatic-Following Fiber Coupler," IEEE Photonics Technology Lett. 8(8):1052-1054 (1996).

Snoeks, E. et al., "Cooperative upconversion in erbium-implanted soda-lime silicate glass optical waveguides," J. Opt. Soc. Am. B 12(8): 1468-1474 (1995).

Dobkin, D.M., "Silicon Dioxide: Properties and Applications".

Inaguma, Yoshiyuki, "High Ionic Conductivity in Lithium Lanthanum Titanate," Solid State Communications, vol. 86, No. 10, pp. 689-693 (1993).

Guy, D., "Novel Architecture of Composite Electrode for Optimization of Lithium Battery Performance," Journal of Power Sources 157, pp. 438-442 (2006).

Wolfenstine, J., "Electrical Conductivity and Charge Compensation in Ta Doped $Li_4Ti_5O_{12}$," Journal of Power Sources 180, pp. 582-585 (2008).

Hill, R. et al., "Large Area Deposition by Mid-Frequency AC Sputtering," Society of Vacuum Coaters, 41st Annual Tech. Conference Proceedings, 197-202 (1998).

(56) References Cited

OTHER PUBLICATIONS

Macák, Karol et al, "Ionized Sputter Deposition Using an Extremely High Plasma Density Pulsed Magnetron Discharge," J. Vac. Sci. Technol. A 18(4):1533-37 (2000).

Jones and Akridge, "A thin film solid state microbattery," Solid State Ionics 53-56 (1992), pp. 628-634.

"Office Action of Jan. 31, 2014 in Japanese Patent Application No. 2011-523097." 10 pages.

EP Search Report dated Jul. 11, 2013 in European Application No. 09807167.3, 13 pgs.

European Examination Report (dated Jun. 4, 2014), Application No. 09 807 167.3, Date Filed—Aug. 11, 2009, (9 pages).

\* cited by examiner

ENERGY DEVICE WITH INTEGRAL COLLECTOR SURFACE FOR ELECTROMAGNETIC ENERGY HARVESTING AND METHOD THEREOF

RELATED APPLICATIONS

This application is related to and claims the benefit under 35 U.S.C. §119 of U.S. Provisional Patent Application Ser. No. 61/087,927, entitled "Energy Device with Integral Collector Surface for Electromagnetic Energy Harvesting and Method Thereof," filed on Aug. 11, 2008, which is incorporated herein by reference in its entirety.

TECHNICAL FIELD AND BACKGROUND OF THE INVENTION

This invention relates to an apparatus and/or a system or method of harvesting energy. In particular, the present invention collects electromagnetic energy that exists in the ambient environment or that is intentionally directed to an energy harvesting device and stores said energy for later use.

Electromagnetic energy exists in all sorts of forms. It is generally used to transmit information, but also exists, albeit typically small, as a source of energy which may be collected and stored.

Generally, systems that collect electromagnetic energy, such as antennas for example, are only designed to capture the information that is being transmitted through the electromagnetic medium and generally do not capture a substantial portion of the energy itself. Information-carrying signals, once received by the antenna, can then be amplified by the receiver and filtered to obtain the information. As such, the focus of such systems is on the information and the particular wavelength on which the information is transmitted, rather than the actual energy itself.

Presently, at the same time that the amount of energy electronic apparatus use is decreasing, the amount of electromagnetic energy being transmitted is increasing. Further, more and more electronics operate autonomously—either passively, by sensing or collecting information, or actively, by performing a function.

SUMMARY OF INVENTION

It is one object of certain exemplary embodiments of this invention to operate by collecting and storing energy from the surrounding environment. Therefore, although certain embodiments of the present invention may contain information-receiving circuitry to accept transmissions, it is one exemplary object of the invention to collect electromagnetic energy from the surrounding environment and store it for current or later use. Various aspects and embodiments of the present invention, as described in more detail and by example below, address certain of the shortfalls of the background technology and emerging needs in the relevant field.

The present invention may include, for example, an apparatus, system, and method for harvesting energy in the form of electromagnetic radiation. In a preferred embodiment the invention may include at least one electrically conductive surface that is adapted to collect electromagnetic energy and an energy storage component to store said energy.

An embodiment of the present invention includes, for example, a metallic or conductive surface within the energy storage component of an energy device such as an antenna to collect energy. The surface may be an integral portion of the energy device, such as a charge collection surface within a battery or a capacitor that mainly provides the battery or a capacitor with another necessary function.

In another embodiment of the invention a metallic or conductive surface may be added to and specifically built into the energy device during manufacturing for the purpose of collecting electromagnetic energy for the energy device but is otherwise not necessary for the energy storage component.

An integral conductive layer of one or more embodiments of the present invention may be composed of the anode or cathode collecting plate of a battery, and may perform the additional function of collecting electromagnetic energy. In one embodiment, the integral conductive layer may also be the actual anode material of an energy device. In another embodiment, the integral conductive layer may be the conductive outer packaging material of an energy device such as the outermost conductive casing of a capacitor.

Added features, patterns, or shapes may be applied to the conductive surface of an energy device to increase efficiency and/or capacity in energy collection for a specific frequency band, broad band, or other energy applications. For flexible devices, the integral conductive surface may, for example, be curved (e.g., z-axis displacement) to enhance its energy collecting capabilities or to enhance its directional reception characteristics.

BRIEF DESCRIPTION OF DRAWINGS

Some features and advantages of the invention are described with reference to the drawing of a certain preferred embodiment, which is intended to illustrate and not to limit the invention.

The accompanying drawing, which is included to provide a further understanding of the invention and is incorporated in and constitutes a part of this specification, illustrates an exemplary embodiment of the invention that together with the description serves to explain certain principles of the invention.

DETAILED DESCRIPTION OF PREFERRED EMBODIMENTS

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art. Similarly, for another example, a reference to "a step" or "a means" is a reference to one or more steps or means and may include sub-steps or subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices and materials are described although any methods, techniques, devices, or materials similar or equivalent to those described may be used in the practice or testing of the present invention. Structures described herein are to be understood also to refer to functional equivalents of such structures.

All patents and other publications are incorporated herein by reference for the purpose of describing and disclosing, for example, the methodologies described in such publications that might be useful in connection with the present invention. These publications are provided solely for their disclosure prior to the filing date of the present application. Nothing in this regard should be construed as an admission that the inventors are not entitled to antedate such disclosure by virtue of prior invention or for any other reason.

This application is related to U.S. patent application Ser. No. 11/561,277, entitled "Hybrid Thin-Film Battery," filed on Nov. 17, 2006, and U.S. patent application Ser. No. 11/687, 032, entitled "Metal Foil Encapsulation," filed on Mar. 16, 2007, which are incorporated by reference herein in their entirety.

Figure 1:
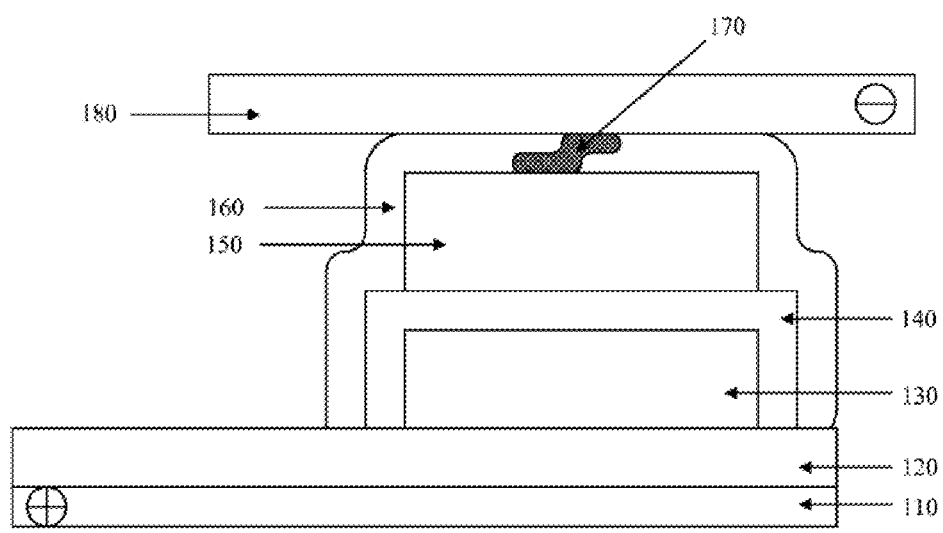
FIG. 1 is a cross section of an embodiment of the present invention with the energy storage component comprising an electrochemical cell.

FIG. 1 shows a cross-sectional side view of one embodiment of the present invention. In this embodiment, the electrically conductive surface 180 forms part of the structure of an energy storage device. In the embodiment shown in FIG. 1, the energy storage device is an electrochemical cell having a cathode 130 and anode 150 separated by an electrolyte 140. This embodiment contains a barrier layer 120 and positive terminal substrate 110. An insulating layer 160 encapsulates the electrochemical cell with one or more conductors 170 extending from anode 150 to the electrically conductive surface 180.

Figure 8:
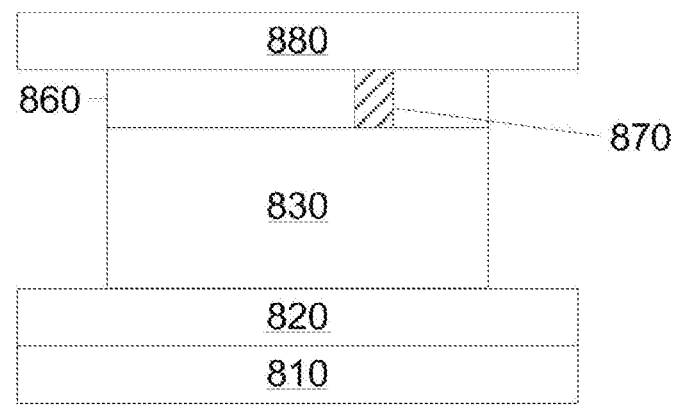
FIG. 8 is a cross section of an embodiment of the present invention comprising an energy storage component.

FIG. 8 shows a cross-sectional side view of an additional embodiment of the invention. In this embodiment, an electrically conductive surface layer 880 forms an integral part of an energy storage component 830 and may be separated by an insulating layer 860. The electrically conductive surface layer 880 may cover the energy storage component 830, and a conductor 870 may connect the electrically conductive surface layer 880 to the energy storage component 830. A positive terminal substrate 810 may be connected to the energy storage component via a barrier layer 820.

In one particular embodiment, the electrochemical cell is a thin film battery as disclosed in U.S. patent application Ser. No. 11/561,277 and previously incorporated by reference. In this embodiment, from bottom to top, the device may, for example, contain a metal foil substrate 110 serving as a positive contact; a barrier layer 120 serving as a cathode current collector and preferably composed of, for example, a gold, silver or platinum sub-layer fabricated over a chromium, nickel, or titanium sub-layer; a cathode 130, preferably composed of, for example, Lithium Cobalt Oxide ($LiCoO_2$); a solid-state electrolyte 140 preferably made of, for example, LiPON; and an anode 150 preferably comprising, for example, Lithium. An insulating/adhesive layer 160 preferably made of, for example, a Surlyn layer that may cover the electrochemical device and a wire mesh conductor 170 may be woven between and in contact with the electrically conductive surface 180 and the electrochemical device.

In addition to an electrochemical storage device, such as a battery or thin film battery, the energy storage component may be an electrical storage device such s a capacitor or thin-film capacitor but may also be a mechanical energy storage device, such as, for example, a flywheel, micro-flywheel, micro electro-mechanical system (MEMS), or a mechanical spring. The energy storage component may also be an electromechanical device, such as a piezo-electric element or a magneto-electric element, such as, for example, various embodiments of the invention disclosed in U.S. Pat. No. 7,088,031, entitled "Method and Apparatus for an Ambient Energy Battery or Capacitor Recharge System" which is herein incorporated by reference in its entirety. The energy storage component may also be a thermal energy storage device, such as a thermal mass container, or it may be a chemical energy storage device, such as, for example, a hydrogen generator with hydrogen container or an ozone generator with ozone container. Each one of these devices may be used to store energy based on certain exemplary elements of the system.

Similarly, the material and geometry of the electrically conductive surface may vary depending on the system application. In a preferred embodiment, the electrically conductive surface may have a suitable electromagnetic impedance that is adapted to the frequencies of the collected electromagnetic energies. In some embodiments, the electrically conductive surface may be made of metals, alloys, semiconductors, conductive organics, polymers, and/or conductive composites. The device may also be flexible, for example, and made to be wound upon itself in order to better collect certain types of electromagnetic energy.

In several embodiments, the electrically conductive surface may also be an integral part of the energy storage component. For example, an electrically energy collecting conductive surface may be embodied by the anode of an electrochemical storage device, the anode current collector of an electrochemical storage device, the cathode of an electrochemical storage device, the cathode current collector of an electrochemical storage device, the encapsulation of an electrochemical storage device, the substrate of an electrochemical storage device, the casing of an electrochemical storage device, the negative electrode of a capacitor, the positive electrode of a capacitor, or the casing of a capacitor.

In some embodiments where the electrically conductive energy collecting surface is integral to the energy storage component, the surface may be, for example, structurally or chemically modified beyond the primary functional need of said energy storage component so as to optimize the adaptation of said surface to the collection of electromagnetic energy. Structural modifications may include enlarging the surface area of one or more surfaces by expanding, stretching, increasing, or otherwise extending the surface. For example in the energy device of FIG. 1 the electrically conductive surface 180 may be expanded, extended, or otherwise increased in shape. Similarly, substrate 110, conductor 170, or any other conductive surface may, for example, be modified to extend the surface area to improve the energy harvesting capacity of that or those elements alone or in combination. Additionally, these conductive surfaces may be increased in thickness or perforated in any preferable direction to increase the surface area and/or the energy harvesting attributes of these device elements.

Figure 9A:
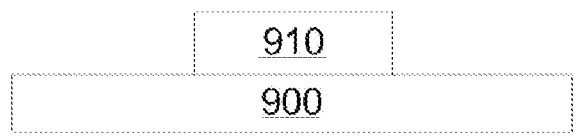
FIGS. 9a and 9b are cross sections of an embodiment of the present invention with an electrically conductive surface layer comprising various conductive protrusions.
Figure 9B:
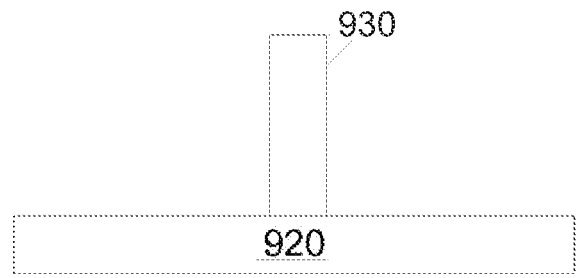

In some embodiments, the electrically conductive surface layer may include one or more protrusions. As shown in FIG. 9a, an electrically conductive surface layer 900 may include a protrusion 910 extending therefrom in a direction parallel to the component layers. Similarly, as shown in FIG. 9b, an electrically conductive surface layer 920 may include a protrusion 930 extending therefrom in a direction orthogonal to the component layers.

Figure 2A:
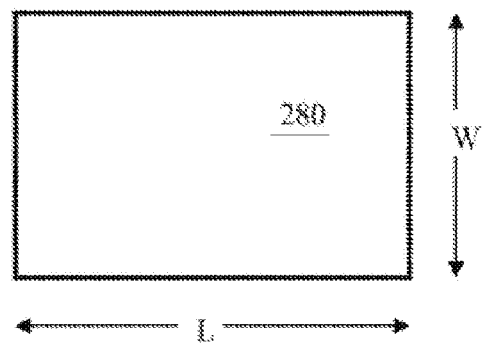
FIG. 2A is a top down view of an embodiment of the present invention with the antenna on top and without adding a depiction of the substrate below it which might extend beyond the dimensions of the antenna.
Figure 2B:
FIG. 2B is a cross-sectional side view of an embodiment of the present invention.

As depicted, for example, in FIGS. 2A and 2B, the height of the dielectric 260 may conform to the thickness of a dielectric in a capacitor or a battery or the separating element in a battery or capacitor or a combination of both. It may, for example, represent a battery cathode thickness plus a separator material. Substrate 230 in FIG. 2B may be provided, for example, by the cathode current collector of a thin film battery. The antenna element 280 may, for example be provided by an anode current collector of a battery or a separate element. The dimensions for the various elements may be derived, for example, by extrapolating from the descriptions found in Antenna Theory, Analysis and Design, $2^{nd}$ edition, Constantine A. Balanis, 1982, 1997, ISBN 0-471-59268-4, incorporated herein in its entirety. The height of the dielectric (h), it's dielectric constant ($\epsilon_r$), and the frequency of interest ($f_r$) may be adjusted by design. Once these values are set, the following equations may, for example, be used to optimize length, and appropriate width ratios. The lengths of the antenna may be some even division of wavelength ($\lambda$), such as $\lambda/2$, $\lambda/4$, $\lambda/8$, $\lambda/16$, and so forth. $V_0$ is the velocity of light in free space.

$$W = \frac{1}{2} f_r \sqrt{\mu_0 \epsilon_0} \cdot \sqrt{2/(\epsilon_r - 1)} = v_0 / 2 f_r \cdot \sqrt{2/(\epsilon_r + 1)}$$

$$L = [1/(2 f_r \sqrt{\epsilon_{reff}} \sqrt{\mu_0 \epsilon_0})] - 2\Delta L \text{ where } \epsilon_{reff} \text{ is the effective dielectric:}$$

$$\epsilon_{reff} = [(\epsilon_r + 1)/2] + [(\epsilon_r - 1)/2] \cdot [1 + 12h/W]^{-1/2}$$

The electrically conductive surface in each embodiment may be designed, for example, to be able to collect electromagnetic energy in one or more particular forms. Such forms may, for example, include electrical field coupled energy, magnetic field coupled energy, light wave direct coupled energy, light wave thermally coupled energy, laser or coherent light coupled energy, sub-millimeter wavelength radiation coupled energy, broad band frequency, narrow band frequency, directed energy, indirect energy, ultra low frequency, super low frequency, very low frequency, low frequency, medium frequency, high frequency, very high frequency, ultra high frequency, super high frequency, extremely high frequency, infra red light frequency, visible light frequency, ultra violet light frequency, and/or x-ray frequency.

Additional components may also be included in certain embodiments of the present invention. For example, an embodiment of the present invention may include one or more electrical components electrical components for rectifying the alternating current induced onto an electrically conductive energy collecting surface into a direct current so that it may be easily stored in, for example, a battery or capacitor. These components may, for example, be external to the energy storage component; however they may also alternatively or additionally be imbedded within the energy storage component. For example, the semiconductor characteristics of Lithium Cobalt Oxide, which may be used as a component of an electrochemical cell, could be n-type and p-type doped in certain regions, thereby creating devices with diode characteristics, which may be configured to operate as a rectifier.

Figure 11:
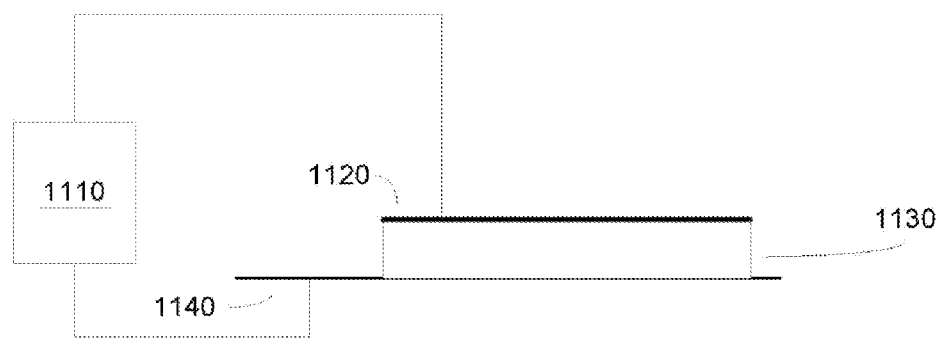
FIG. 11 is a top down view of an embodiment of the present invention including a rectifying element.

For example, FIG. 11 depicts an embodiment of the invention providing a rectifying element 1110 positioned between an antenna surface 1120 and conductive substrate surface 1140. As described by example above, the antenna surface 1120 may, for example be provided by an anode current collector of a battery or a separate element. A dielectric 1130 may be representative of the dielectric in a capacitor or a battery or the separating element in a battery or capacitor or a combination of both. It may, for example, represent a battery cathode thickness plus a separator material. The conductive substrate surface 1140 may be provided, for example, by the cathode current collector of a thin film battery. Direct charging of the energy storage device may be accomplished, for example, by connecting the rectifying element 1110 between the antenna surface 1120 and the conductive substrate surface 1140. The rectifying element 1110 may be an integral portion of the manufactured energy storage device or an external discreet component.

Figure 3A:
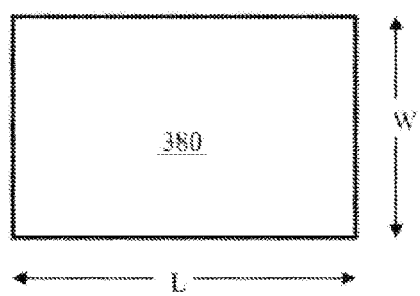
FIG. 3A is a top down view of an embodiment of the present invention with the antenna on top and without adding a depiction of the substrate below it which might extend beyond the dimensions of the antenna.
Figure 3B:
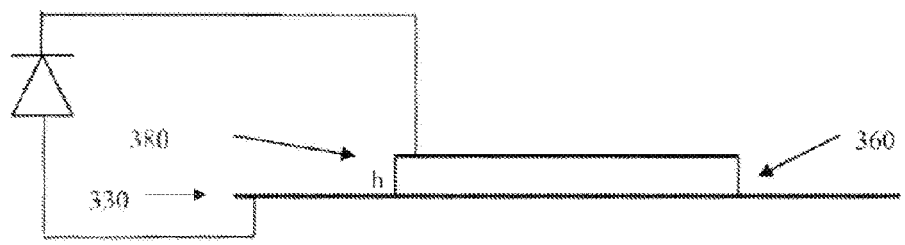
FIG. 3B is a cross-sectional side view of an embodiment of the present invention adding a diode.

FIGS. 3A and 3B depict an embodiment of the invention providing a diode between an antenna surface 380 and conductive substrate surface 330. As described by example above, the antenna surface 380 may, for example be provided by an anode current collector of a battery or a separate element. Dielectric 360 may be representative of the dielectric in a capacitor or a battery or the separating element in a battery or capacitor or a combination of both. It may, for example, represent a battery cathode thickness plus a separator material. Substrate surface 330 in FIG. 3B may be provided, for example, by the cathode current collector of a thin film battery. Direct charging of the energy storage device may be accomplished, for example, by connecting a diode between the antenna surface and the conductive substrate surface. This connection may be of the cathode of the diode attached to the antenna surface 380 and the anode of the diode connected to the substrate surface 330. The diode may be an integral portion of the manufactured energy storage device or an external discreet component.

Figure 4:
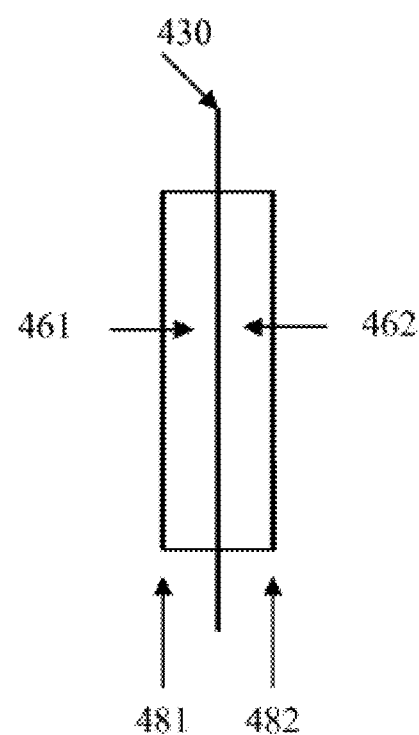
FIG. 4 is cross-sectional side view of an embodiment of an omni-directional array of the present invention.
Figure 5:
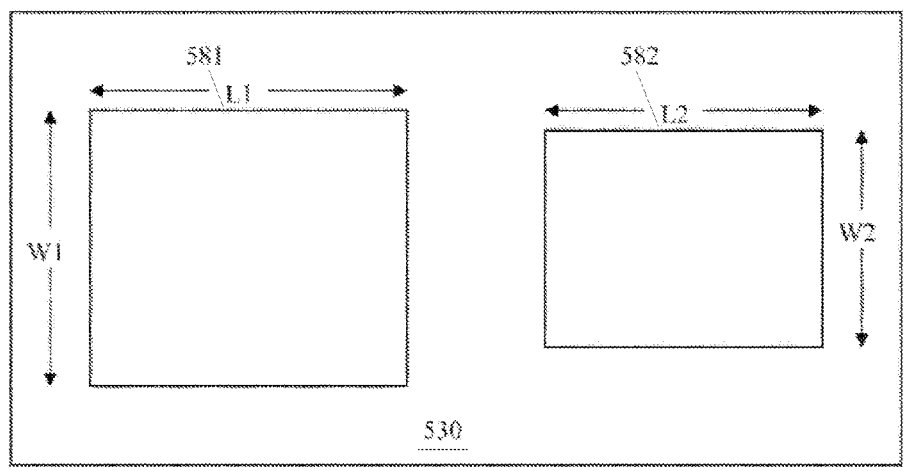
FIG. 5 is a cross-sectional side view of an embodiment of a dual frequency array of the present invention.
Figure 6:
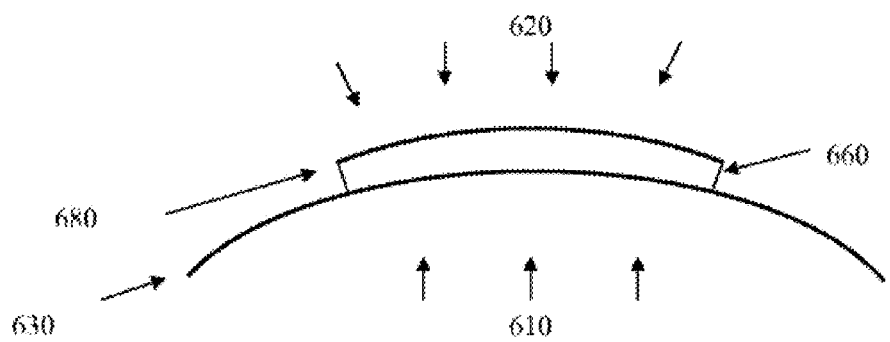
FIG. 6 is a cross-sectional side view of an embodiment of a curved surface energy device used in an omni directional format of the present invention.

A system for harvesting electromagnetic energy is also, for example, provided by various disclosures herein. This system may for example include a plurality of energy harvesting devices connected together to form an array. The arrangement of devices within the array may vary to, for example, optimize the collection of electromagnetic energy in an omni-directional or uni-directional manner. The energy harvesting devices themselves may vary within a single system, for example, to optimize the collection of electromagnetic energy of varying wavelengths-this may include the shape and size of the electrically conductive surface, but also the type of material. Further, the interconnection of the energy harvesting devices may be arranged in series or parallel, for example, to create certain voltage outputs. One example of an omni-directional array, as depicted in FIG. 4, provides for two substrates 430 to be placed together and the collection surfaces 481 and 482 to be directed outwardly. Dielectric layers 461 and 462 are provided between the substrate 430 and collection surfaces 481 and 482. Alternatively, a substrate with a battery or other energy storage device may be placed on either side of the substrate. Multiple surfaces of various configurations may also be provided. A multifrequency array may be provided, for example as depicted in FIG. 5 by providing two energy storage devices 581, 582, possibly with differing L/W ratios (i.e., $L1/W1 \neq L2/W2$), for example, on one or more substrates 530. Multiple surfaces and/or devices may also be provided in various embodiments. Alternatively, the top of a single cell may be provided with an insulator/conductor patterned top that electrically "looks" like the arrangement of FIG. 5, providing a multi-frequency antenna with no external alteration because the battery substrate would "look" like the total substrate in the figure. FIG. 6 provides one example of a curved surface energy device that may be used in an omni directional format. The curve may be used to create a receiving surface that is, for example, some portion of a sphere to allow gathering energy 610 and/or 620 as shown coming from the bottom or top of the drawing. As discussed, by way of example above, a diode may similarly be integrated into this exemplary design. Further, an antenna element 680, dielectric element 660 and substrate element 630 may be provided, for example, as shown.

Figure 7A:
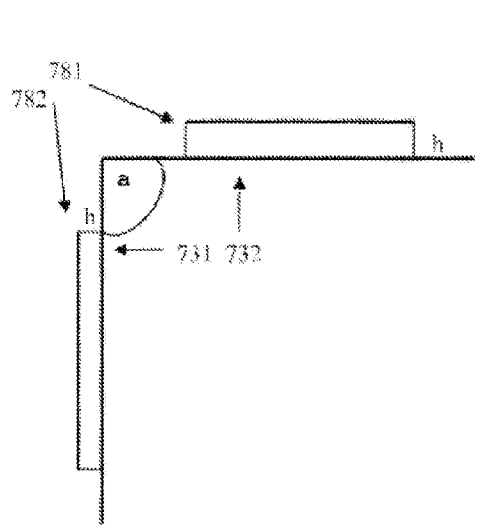
FIG. 7A is a cross-sectional top view of a multi-planar embodiment of the present invention.
Figure 7B:
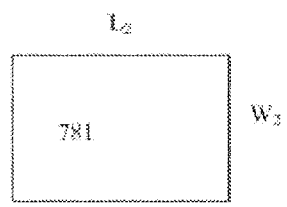
FIG. 7B is a side view of one device of a multi-planar embodiment of the present invention.
Figure 7C:
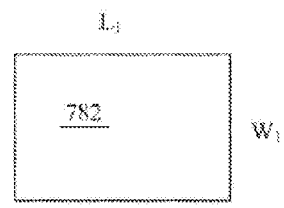
FIG. 7C is a side view from a different angle of a second device of a multi-planar embodiment of the present invention.

An example of a multi-planar embodiment of the present invention is set forth, for example, in FIGS. 7A, 7B, and 7C. In this example, two or more devices (depicted in FIG. 7A as 781, 782) may be arranged at an angle a to each other. These devices may be built on separate substrates (depicted as 731 and 732 in FIG. 7A) or on one substrate that is formed at the appropriate angle either during manufacturing or as a post process step. The angle a may be any angle, and may, for example range from 0° to 180°. Device 781 has a length of $L_2$ and a width of $W_2$, as illustrated in FIG. 7B. Device 782 has a length of $L_1$ and a width of $W_1$ as illustrated in FIG. 7C. The length, width and height values (L, W, and h), and ratio's for these values, for any given frequency, group of frequencies, or any pair of frequencies or bands may be identical or entirely different. Additionally, diode rectification may be performed on this or these embodiments similarly to a single plane device wherein a diode may be provided, for example, across each antenna/substrate.

Figure 10A:
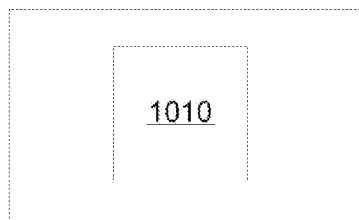
FIGS. 10a-10d are various views of electrically conductive surface layers having various shapes.
Figure 10B:
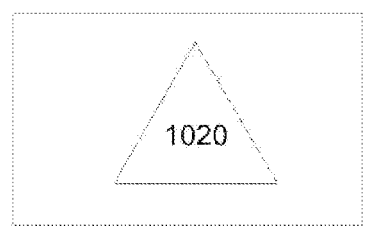
Figure 10C:
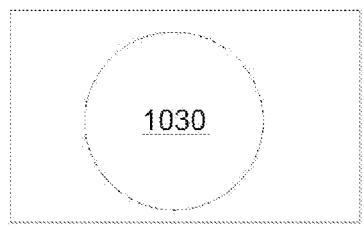
Figure 10D:
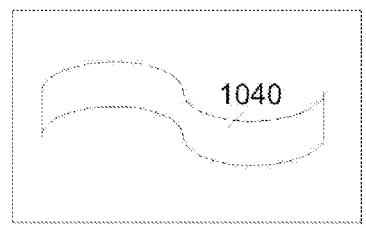

FIGS. 10a-10d illustrate various energy devices and/or energy storage components having varying geometric shapes. For example, as shown in FIG. 10a, the energy device or energy storage component may have a square, rectangular, or multi-sided polygonal shape 1010. As shown in FIG. 10b, the energy device or energy storage component may have a triangular or non-uniform in thickness shape 1020. As shown in FIG. 10c, the energy device or energy storage component may have a circular, round or curvy shape 1030. As shown in FIG. 10d, the energy device or energy storage component may have a wavy shape 1040.

Figure 12A:
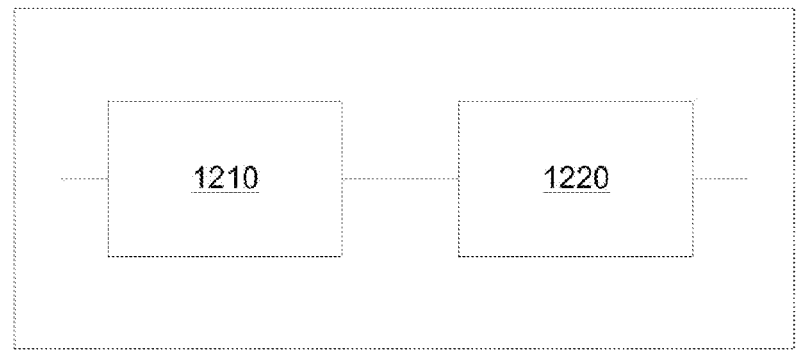
FIG. 12a is a top down view of an embodiment of the present invention including multiple energy collection components connected in series.
Figure 12B:
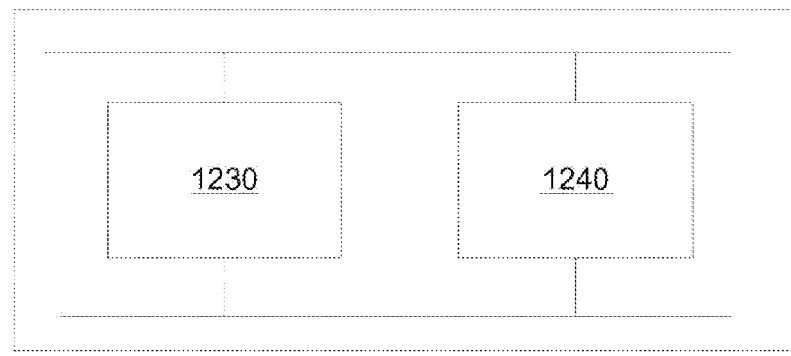
FIG. 12b is a top down view of an embodiment of the present invention including multiple energy collection components connected in parallel.
Figure 13A:
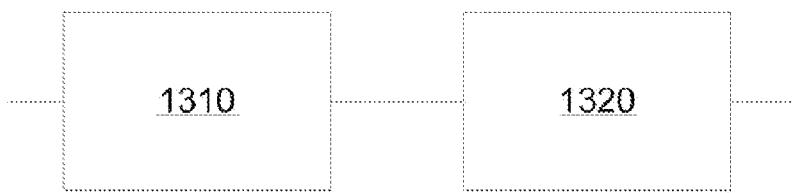
FIG. 13a is a top down view of an embodiment of the present invention including multiple energy devices connected in series.
Figure 13B:
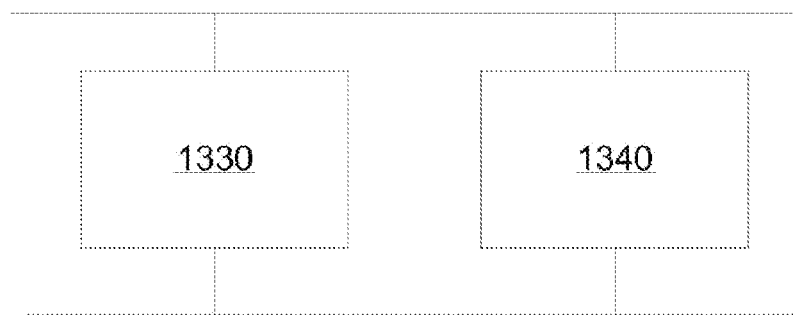
FIG. 13b is a top down view of an embodiment of the present invention including multiple energy devices connected in parallel.

As shown in FIG. 12a, multiple energy storage components 1210 and 1220 may be operably connected in series. Alternatively, as shown in FIG. 12b, multiple energy storage components 1230 and 1240 may be operably connected in parallel. Similarly, as shown in FIG. 13a, multiple energy devices 1310 and 1320 may be operably connected in series. Alternatively, multiple energy devices 1330 and 1340 may be connected in parallel.

This system may be used, for example, to supply power to an autonomous electrical circuit solely, or in conjunction with another source of power, such as, for example, a solar cell or solar thermal collector. Such a combination would allow for an autonomous electrical circuit to operate with or without sunlight in an environment containing electromagnetic energy. For example, a solar cell may be deposited directly onto a storage device during manufacture, on top or bottom. This deposition may include PVD or, for example, printing. Such a solar cell may include at least two semi-conductors in contact with each thereby creating a p-n junction. In addition, there may be metallically conducting current collectors and a substrate in the solar cell. In particular, a dielectic layer such as, for example, $SiO_2$ may be covered by a metallically conducting anti-reflection layer such as, for example, Si—Ti—Pd—Ag. Similar to a battery that might serve as an antenna-like receiver plane, a solar cell may be provided that may produce energy but may not store the energy. However, the $SiO_2$/Si—Ti—Pd—Ag antenna-like receiver plane may be connected to a battery, which in turn may or may not serve as an antenna-like receiver plane to its own self.

A method of harvesting electromagnetic energy and/or a new use of a device for energy harvesting is also, for example, described herein. For example, one or more energy harvesting devices or systems may be placed in an environment containing a known or unknown source of electromagnetic energy with known or unknown parameters such as frequency and power. The electromagnetic energy incident upon the electrically conductive surface may induce a current into the electrically conductive surface. That current may then be collected by the energy storage component. In one embodiment, an electrical current is, for example, rectified by a rectifier circuit before it charges an electrochemical cell or capacitor. The electrical current may also charge other energy storage components mentioned above. Having collected and stored the energy, the device may then be able to, for example, provide an autonomous electrical device power to operate for a period of time.

This invention has been described herein in several embodiments. It is evident that there are many alternatives and variations that can embrace the performance of energy or electronic devices enhanced by the present invention in its various embodiments without departing from the intended spirit and scope thereof The embodiments described above are exemplary only. One skilled in the art may recognize variations from the embodiments specifically described here, which are intended to be within the scope of this disclosure. As such, the invention is limited only by the following claims. Thus is intended that the present invention cover the modifications of this invention provided they come within the scope of the appended claims and their equivalents.

What is claimed is:

1. An energy device comprising:
   an energy storage component comprising an electrochemical cell having a plurality of component layers;
   at least one electrically conductive surface layer that is provided by an anode current collector of said energy storage component,
   wherein said at least one electrically conductive surface layer is adapted to collect electromagnetic energy thereby enabling a current to be induced within the at least one electrically conductive surface layer, and wherein the energy storage component is adapted to collect and store at least a portion of the current, wherein said at least one electrically conductive surface layer comprises an electrically conductive protrusion extending in a direction parallel to the plurality of component layers of the electrochemical cell and said at least one electrically conductive surface layer extends beyond a dimension of the plurality of component layers of the electrochemical cell; and
   a substrate that is provided by a cathode current collector of said energy storage component, wherein the substrate extends beyond a dimension of said at least one electrically conductive surface layer.

2. The energy device of claim 1, wherein said energy storage component comprising components selected from the group of: a battery, or a thin-film battery.

3. The energy device of claim 1, wherein said electrically conductive surface comprises a suitable electromagnetic impedance that is adapted to frequencies of the collected electromagnetic energies such that the dimensions of said electrically conductive surface are sized to create signal gains in the wavelength targeted for harvesting.

4. The energy device of claim 3, wherein said electrically conductive surface layer comprises a height of a dielectric (h), and a dielectric constant ($\epsilon_r$), and said dimensions of said electrically conductive surface layer for harvesting energy frequency ($f_r$) comprises width $$W = 1/2 f_r \sqrt{\mu_0 \epsilon_0} * \sqrt{2/(\epsilon_r - 1)} = v_0/2 f_r * \sqrt{2/(\epsilon_r + 1)} \text{ and length}$$

$$L = [1/(2 f_r \sqrt{\epsilon_{reff}} \sqrt{\mu_0 \epsilon_0}) - 2\Delta L \text{ where } v_0 = 1/\sqrt{\mu_0 \epsilon_0} = a$$
velocity of light in free space, $\Delta L$ = change in length, and $\epsilon_{reff}$ is the effective dielectric:

$$\epsilon_{reff} = [(\epsilon_r + 1)/2] + [(\epsilon_r - 1)/2] * [1 + 12h/W]^{-1/2}.$$

5. The energy device of claim 1, wherein said at least one electrically conductive surface is structurally or chemically modified beyond the primary functional need by said energy storage component, whereby said modification causes an increase in the ability of said electrically conductive surface layer to collect electromagnetic energy.

6. The energy device of claim 5, wherein the electrically conductive protrusion is a first electrically conductive protrusion, wherein said at least one electrically conductive surface layer further comprises a second electrically conductive protrusion extending in the direction orthogonal to the energy storage component layers.

7. The energy device of claim 5, wherein said electrically conductive surface comprises a height of a dielectric (h), and a dielectric constant ($\epsilon_r$), and said dimensions of said electrically conductive surface layer for harvesting energy frequency ($f_r$) comprises width $$W = 1/2 f_r \sqrt{\mu_0 \epsilon_0} * \sqrt{2/(\epsilon_r + 1)} = v_0/2 f_r * \sqrt{2/(\epsilon_r + 1)} \text{ and length}$$

$$L = [1/(2 f_r \sqrt{\epsilon_{reff}} \sqrt{\mu_0 \epsilon_0}) - 2\Delta L \text{ where } v_0 = 1/\sqrt{\mu_0 \epsilon_0} = a$$
velocity of light in free space, $\Delta L$ = change in length, and $\epsilon_{reff}$ is the effective dielectric:

$$\epsilon_{reff} = [(\epsilon_r + 1)/2] + [(\epsilon_r - 1)/2] * [1 + 12h/W]^{-1/2}.$$

8. The energy device of claim 5 wherein said electrically conductive surface is adapted to affect the RF conductive properties in regions of the electrically conductive surface layer to provide for isolated, conductive and semicondutive areas.

9. The energy device of claim 1, wherein the electrically conductive protrusion is a first electrically conductive protrusion, wherein said at least one electrically conductive surface layer further comprises a second electrically conductive protrusion extending in a direction orthogonal to the energy storage component.

10. The energy device of claim 1, further comprising said electrically conductive surface incorporated into said device during the fabrication of said energy storage component.

11. The energy device of claim 10 wherein a conductive layer and an associated insulating layer are added to said device during the fabrication of said energy storage component.

12. The energy device of claim 1, wherein said electrically conductive surface comprises a material selected from the group of: metals, alloys, semiconductors, conductive organics and polymers, and conductive composites.

13. The energy device of claim 1, wherein the shape of said device is selected from the group of: square, rectangular, triangular, multi-sided polygonal, round, curved, wavy, and non-uniform in thickness.

14. The energy device of claim 1, wherein the collected electromagnetic energy comprises energy selected from the group of: electrical field coupled energy, magnetic field coupled energy, light wave direct coupled energy, light wave thermally coupled energy, laser or coherent light coupled energy, and sub-millimeter wavelength radiation coupled energy.

15. The energy device of claim 1, further comprising a plurality of electrically conductive surfaces.

16. The energy device of claim 15, wherein said electrically conductive surfaces are adapted to form an array that improves the collection of power of the electromagnetic energy in an omni-directional response.

17. The energy device of claim 15, wherein said electrically conductive surfaces are adapted to form an array that improves the collection of power of the electromagnetic energy in an uni-directional response.

18. The energy device of claim 15, wherein said plurality of electrically conductive surfaces comprises a connection in series or in parallel that are adapted to collect electromagnetic energy.

19. The energy device of claim 18, wherein all electrically conductive surfaces comprise substantially equal size and shape.

20. The energy device of claim 18, wherein at least one of said electrically conductive surfaces comprises a substantially different size and shape than other electrically conductive surfaces.

21. The energy device of claim 1, further comprising at least one external rectification element adapted to rectify the collected electromagnetic energy.

22. The energy device of claim 21, wherein said at least one rectification element is selected from the group of external diode, rectenna comprising said external diode and said electrically conductive surface, external full bridge rectifier, external half bridge rectifier, and external reactive components, wherein said external reactive components comprise any combination of capacitors, coils, diodes, transistors, RF chokes, and integrated devices.

23. The energy device of claim 1, wherein said at least one electrically conductive surface layer comprises at least two electrically conductive surfaces of differing sizes.

24. The energy device of claim 1, wherein said at least one electrically conductive surface layer comprising at least two electrically conductive surfaces of similar sizes.

25. The energy device of claim 1, wherein said energy storage component comprises a geometrical shape selected from the group of square, rectangular, triangular, multi-sided polygonal, round, curved, wavy, and non-uniform in thickness.

26. The energy device of claim 1, further comprising more than one energy storage component.

27. The energy device of claim 1, wherein said energy storage components comprises two or more energy storage components connected in series or in parallel and wherein at least one of said energy storage components is adapted for said at least one electrically conductive surface layer to be adapted to collect electromagnetic energy.

28. The energy device of claim 27, wherein said energy storage components all comprise substantially the same size and shape.

29. The energy device of claim 27, wherein at least one of said energy storage components comprise a substantially different size and shape than the other energy storage components.

30. The energy device of claim 1 further comprising one or more layers between a plurality of conductive surfaces, said layers comprising an insulating layer.

31. An array comprising a plurality of energy devices of claim 1.

32. The array of claim 31, further comprising electrically conductive surfaces adapted to collect electromagnetic energy in an omni-directional response.

33. The array of claim 32, comprising a substrate element and at least two collection surfaces, each said collection surface located on opposite sides of said substrate element.

34. The array of claim 31, further comprising electrically conductive surfaces adapted to collect electromagnetic energy in a uni-directional response.

35. The array of claim 31, wherein said array of energy devices comprise a connection in series or in parallel and wherein at least one of said energy devices provides an electrically conductive surface that is adapted to collect electromagnetic energy.

36. The energy device of claim 35, wherein said energy devices all comprise substantially equal size and shape.

37. The energy device of claim 35, wherein at least one of said energy devices comprise a substantially different size and shape than the other energy devices.

38. A method of collecting electromagnetic energy within an environment containing electromagnetic energy comprising:
providing at least one energy harvesting device within the environment,
said device comprising an electrically conductive surface, a substrate, and an energy storage component,
wherein the electrically conductive surface is provided by an anode current collector of the energy storage component,
wherein the electrically conductive surface is adapted to collect the electromagnetic energy thereby enabling a current to be induced within the electrically conductive surface,
wherein the energy storage component comprises and electrochemical cell having a plurality of component layers,
wherein the electrically conductive surface comprises an electrically conductive protrusion extending in a direction parallel to the plurality of component layers of the electrochemical cell and the electrically conductive surface extends beyond a dimension of the plurality of component layers of the electrochemical cell,
wherein the substrate is provided by a cathode current collector of the energy storage component and extends beyond a dimension of the electrically conductive surface;
collecting the electromagnetic energy from the environment across said electrically conductive surface; and
storing the energy in said energy storage component.

39. The method of claim 38, further comprising modifying the geometry of said electrically conductive surface to improve the collection of electromagnetic energy.

40. The method of claim 38, further comprising rectifying the collected electromagnetic energy before storing the energy in said energy storage component.

41. The method of claim 38, further comprising powering an autonomous electrical device.

42. The method of claim 38 further comprising incorporating said electrically conductive surface into said device during -fabrication of said energy storage component.

* * * * *